United States Patent
Barbara et al.

(10) Patent No.: US 12,554,812 B2
(45) Date of Patent: Feb. 17, 2026

(54) SYSTEMS AND METHODS FOR ACCESS AUTHENTICATION USING PRIORITIZED PERSONAL INFORMATION QUESTIONS FOR DATA ACCESS AND DELETION IN DISTRIBUTED SERVICE SYSTEMS

(71) Applicant: Stripe, Inc., South San Francisco, CA (US)

(72) Inventors: Erik Barbara, South San Francisco, CA (US); Marc Doan, South San Francisco, CA (US); Lara Mossler, South San Francisco, CA (US); David Sargent, South San Francisco, CA (US)

(73) Assignee: Stripe, Inc., South San Francisco, CA (US)

( * ) Notice: Subject to any disclaimer, the term of this patent is extended or adjusted under 35 U.S.C. 154(b) by 649 days.

(21) Appl. No.: 17/892,801

(22) Filed: Aug. 22, 2022

(65) Prior Publication Data
US 2024/0061916 A1 Feb. 22, 2024

(51) Int. Cl.
G06F 21/32 (2013.01)
G06F 21/62 (2013.01)

(52) U.S. Cl.
CPC .......... *G06F 21/32* (2013.01); *G06F 21/6245* (2013.01)

(58) Field of Classification Search
CPC .............................. G06F 21/32; G06F 21/6245
USPC ........................................................... 726/19
See application file for complete search history.

(56) References Cited

U.S. PATENT DOCUMENTS

| | | | | |
|---|---|---|---|---|
| 7,006,980 | B1 * | 2/2006 | Snyder | G06Q 40/02 705/37 |
| 7,978,605 | B2 * | 7/2011 | Aboujaoude | H04L 67/306 370/352 |
| 8,161,534 | B2 * | 4/2012 | Golle | G06F 21/46 713/168 |
| 8,219,823 | B2 * | 7/2012 | Carter | G06F 21/31 707/786 |
| 8,560,935 | B2 * | 10/2013 | Jaffe | G06Q 10/10 715/224 |
| 8,990,312 | B2 * | 3/2015 | Wilson | H04L 51/212 709/206 |
| 9,503,545 | B2 * | 11/2016 | Shuster | H04L 9/0819 |
| 10,152,609 | B2 * | 12/2018 | Grubel | H04L 63/0407 |
| 10,231,122 | B2 * | 3/2019 | Childress | H04L 63/0853 |
| 10,528,710 | B2 * | 1/2020 | Mao | H04L 63/08 |

(Continued)

*Primary Examiner* — Amare F Tabor
(74) *Attorney, Agent, or Firm* — Finnegan, Henderson, Farabow, Garrett & Dunner, LLP

(57) ABSTRACT

A method and apparatus for a distributed service provider system performing authentication for access to, and deletion of, user data, is described. The method may include monitoring service system responses to requests for user data associated with a user identifier. The method may further include ordering the monitored user data based on one or more of a sensitivity level and a veracity level associated with each of the monitored user data, and filtering out user data from the monitored user data that is not suitable for presenting to the user for identity verification. Furthermore, the method can include selecting a subset of the filtered user data for a series of identity verification questions for generating and transmitting, to the user system, a series of security verification questions, each security verification question based on one of the selected subset of the filtered user data.

20 Claims, 9 Drawing Sheets

(56) References Cited

U.S. PATENT DOCUMENTS

| | | | | |
|---|---|---|---|---|
| 10,797,871 | B1* | 10/2020 | McCormack | H04L 9/0643 |
| 2005/0039056 | A1* | 2/2005 | Bagga | G06F 21/31 |
| | | | | 726/19 |
| 2005/0039057 | A1* | 2/2005 | Bagga | G06F 21/46 |
| | | | | 726/19 |
| 2006/0292539 | A1* | 12/2006 | Jung | G09B 7/06 |
| | | | | 434/322 |

* cited by examiner

SYSTEMS AND METHODS FOR ACCESS AUTHENTICATION USING PRIORITIZED PERSONAL INFORMATION QUESTIONS FOR DATA ACCESS AND DELETION IN DISTRIBUTED SERVICE SYSTEMS

RELATED APPLICATIONS

This application is related to U.S. patent application Ser. No. 17/892,791, titled "SYSTEMS AND METHODS FOR DATA ACCESS AND DELETION IN DISTRIBUTED SERVICE SYSTEMS", filed on Aug. 22, 2022, and to U.S. patent application Ser. No. 17/892,632, titled "SYSTEMS AND METHODS FOR AUGMENTATION OF USER DATA DURING DATA ACCESS AND DELETION IN DISTRIBUTED SERVICE SYSTEMS", filed on Aug. 22, 2022.

BACKGROUND

Organizations are increasingly using distributed computing techniques to provide their products and services to end users. Such distributed computing techniques often involve the distribution of tasks performed by different physical computing resources that communicate with one another via a computing network. The distributed physical computing resources utilize network-based communication to exchange messaging that support each physical machine's functions and/or the functions of other machines within the distributed computing environment to complete an overall operation through a collection of distributed tasks. Thus, the collection of distributed physical computing resources cooperate to provide the organization's products and services to their end users.

One approach to an organization utilizing distributed computing systems is to represent different concepts and/or resources as distinct services, where distinct services each have their own distinct processing resources and data storage within the distributed computing environment. Then, service-to-service network calls provide information transfer, requests for support services (e.g., where a service performs some function for another service), responses (e.g., a result of one service performing a requested function), etc. to support the various operations, services, and products of the organization.

While the distribution of concepts and/or resources as distinct services processed by distinct systems is helpful in developing, maintaining and then providing multiple services by an organization to end users, certain problems may arise. In particular, one such problem arises when seeking to provide access and enable deletion of user data in a distributed service system. For example, an end user may want to know if the organization has stored user data (e.g., a user's name, telephone number, email address, credit card information, mailing address, etc.). Since each service acts partially or fully autonomously, each service may store user data, store the data in a different format, and process the data in different ways. Thus, when one or more of the distributed services stores users' data, because of the different processing, storage, and handling by the services, it may be difficult for a central point of contact of the organization to determine which service or service(s) currently store user data. The same problem exists if the user then seeks to have the organization delete their data. That is, deletion must be carried out by each system and how the deletion request is generated, transferred, handled, and then responded to, may also be different for each service of the organization. As a result, it becomes increasingly complex and difficult to service user data access and deletion requests in distributed computing systems.

Additionally, governmental regulations are increasingly requiring that consumers/end users are given certain rights to their data. For example, such regulations include General Data Protection Regulation (GDPR), California Consume Privacy Act (CCPA), as well as other existing and forthcoming regulations. These rights can include ensuring that end user access and/or deletion requests are fulfilled, that the operations taken to fulfill the end user's requests are documented, that such requests are fulfilled within prescribed time limits, as well as other regulations concerning how a user can control their personal data.

Therefore, solution to the technical challenges that arise from the modern distributed computing approach to providing services to end users, for providing data access and deletion functionality to those end users, is becoming increasingly important. Furthermore, technical solutions that ensures proper and full access and deletion to all user data across distributed systems, extensibility to new services in distributed computing system, and ensuring secure access to sensitive information that is subject to deletion, are needed to resolve the problems discussed above.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

DETAILED DESCRIPTION

Figure 1:
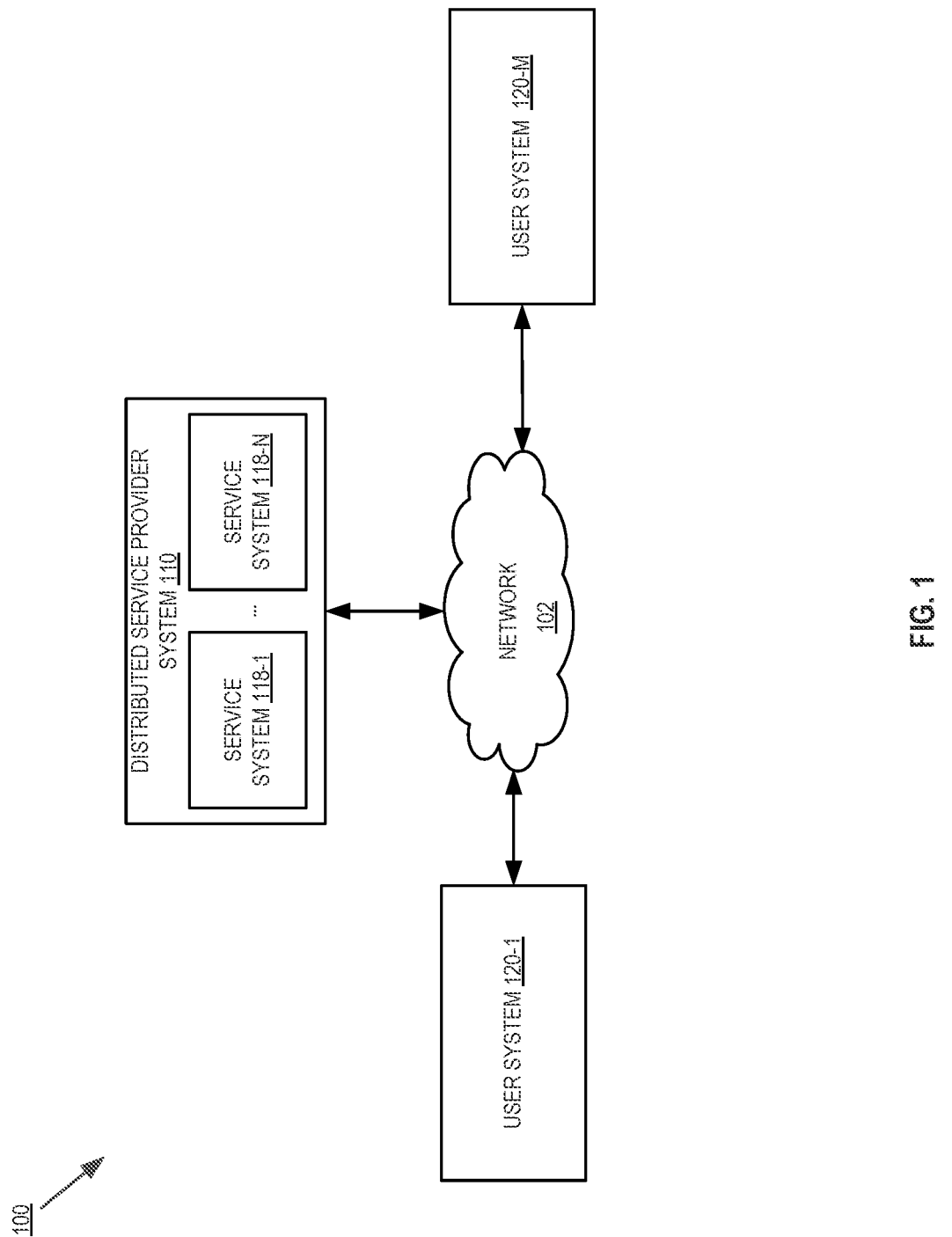
FIG. 1 is a block diagram of an exemplary system architecture for a distributed service provider system providing data access and deletion to end users.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "passing", "serving", "verifying", "sending", "posting", "getting", "requesting", "receiving", "matching", "adding", "confirming", "generating", "returning", "inferring", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

FIG. 1 is a block diagram of an exemplary system architecture 100 for a distributed service provider system 110 providing data access and deletion to end users. In one embodiment, the system 100 includes distributed service provider system 110 and one or more user systems, such as user system 120-1 through 120-M. In one embodiment, one or more systems (e.g., systems 120-1 through 120-M) may be mobile computing devices, such as a smartphone, tablet computer, gaming devices, medical devices, smartwatch, etc., as well as computer systems, such as a desktop computer system, laptop computer system, server computer systems, etc. used by end users to access the products provided by distributed service provider system 110. The distributed service provider system 110 may also be one or more computing devices, such as one or more server computer systems, desktop computer systems, etc.

The distributed service provider system 110 and user systems 120-1 through 120-M may be coupled to a network 102 and communicate with one another using any of the standard protocols for the exchange of information, including secure communication protocols. In one embodiment, one or more of the distributed service provider system 110 and user systems 120-1 through 120-M may run on one Local Area Network (LAN) and may be incorporated into the same physical or logical system, or different physical or logical systems. Alternatively, the distributed service provider system 110 and user systems 120-1 through 120-M may reside on different LANs, wide area networks, cellular telephone networks, etc. that may be coupled together via the Internet but separated by firewalls, routers, and/or other network devices. In one embodiment, distributed service provider system 110 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, distributed service provider system 110 provides financial processing products to one or more merchants, agents of the merchants, end users, etc. For example, distributed service provider system 110 may manage merchant accounts held at the distributed service provider system 110, run financial transactions initiated at end user system performed on behalf of a merchant systems, clear transactions, performing payouts to merchants and/or merchants' agents, manage merchant and/or agent accounts held at the distributed service provider system 110, as well as other services typically associated with commerce platforms systems such as, for example, STRIPE™. However, distributed service provider system 110 is not limited to financial processing systems, as any distributed computing system that distributes service processing among different physical machines and seeks to ensure access and deletion of user data, may use the techniques discussed herein. For example, distributed computing environments that provide media distribution products, productivity products, social networking products, gaming products, customer relationship management products, communication products, medical products, etc. may utilize the techniques discussed herein.

In an embodiment, distributed service provider system 110 is a distributed computing environment that provides products to end users, such as users associated with user system(s) 120-1 through 120-M. Each end user system may interact directly with the products or services of the distributed service provider system 110, or through a merchant system (not shown) that employs the products or services of the distributed service provider system 110 (e.g., application programming interface(s) (APIs), software libraries, products, etc.) to interact with end users. Products and services of the distributed service provider system 110 can be considered to be anything from systems that support end users (e.g., data storage, content management, payment processing, etc.).

In embodiments, distributed service provider system 110, in providing their product(s) to user systems 120-1 through 120-M, therefore represents different concepts within the distributed service provider system 110 as services. For example, a first service may process functions, actions, etc. to perform a first concept, a second service may process functions, actions, etc. to perform a second concept, and so on. For example, for a distributed service provider system 110 that provides subscription service management for an end user system 120-1, the concepts used for providing the subscription service management may include a subscription concept that handles setting up new subscriptions, managing subscription parameters, cancelling existing subscriptions, and initiating subscription billing. The concepts may further include a second, and distinct, invoicing concept that generates, distributes, and tracks invoices for subscriptions. Furthermore, as is important in distributed service based systems, the invoicing concept not only interacts with the subscription concept, but may also interact with other concepts that may utilize invoicing for their respective concepts, such as a single-time purchase concept, an insurance concept, a refund processing concept, a resource tracking and utilizing concept, etc.

In embodiments, each concept is implemented as a service within the distributed service provider system 110, such that the service is executed on a distinct service system. Thus, distributed service provider system 110 includes a plurality of service systems 118-1 through 118-N that support the concepts that, as a whole, support the products of the distributed service provider system 110. Furthermore, each of the plurality of service systems 118-1 through 118-N are executed by one or more distinct processing systems having their own resources (e.g., processor(s), memory, network interfaces, transceivers, etc.), their own software implementations, and provide service-to-service messaging as network based messaging between the distinct processing resources. Each of these concepts may therefore independently store and use user data to provide their respective services.

As discussed herein, since each service of the distributed service provider system 110 is performed on a distinct service system, which has its own processing resources, storage, and implementation, the way in which user data is used, stored, accessed, and deleted may be different. For example, service system 118-1 may have a first set of user data stored in a table that is identified by specific user identifiers, whereas service system 118-N may store a second set of user data (which may or may not include user data from the first set), which is stored in a different table and potentially identified with a different identifier. Thus, if distributed service provider system 110 were to receive a request from user system 120-1 that requested to know what user data is stored by distributed service provider system 110, and/or to delete the stored data, such a request(s) would be difficult to fulfill due to the distribution of systems 118, the independent development and operation of the systems 118, potentially different formatting used by the systems 118 when storing user data, potentially different formats of data storage used by the systems 118, etc. Furthermore, additional regulatory requirements may require that distributed service provider system 110 be able to fulfill such request(s) within prescribed time limits.

In embodiments, as will be discussed in greater detail below, distributed service provider system 110 addresses the technical challenges noted herein by providing a front-end tool accessible by user systems 120-1 through 120-M to request access to their data (e.g., initiate a request to determine what user data may be stored at the distributed service provider system 110), and then subsequently request deletion of all or some of that data. Furthermore, the front-end tool may fulfill the requests without establishing a user account, as a specific user identifier is used to submit the request and further verify an identity of the user prior to fulfilling any access and/or deletion requests. Additionally, once verified, the user may submit requests to access and/or delete user data within a single user interface, and any returned personal information (e.g., in response to an access request) is handled in a secure fashion, within a predetermined time limit. Furthermore, because the distributed service provider system 110 is likely to expand to provide new and/or different services to end users, the techniques for providing access to distributed services 118 is extensible though an application programming interface (API) based messaging approach for efficient integration with the new systems. These concepts will be discussed in greater detail below.

Figure 2:
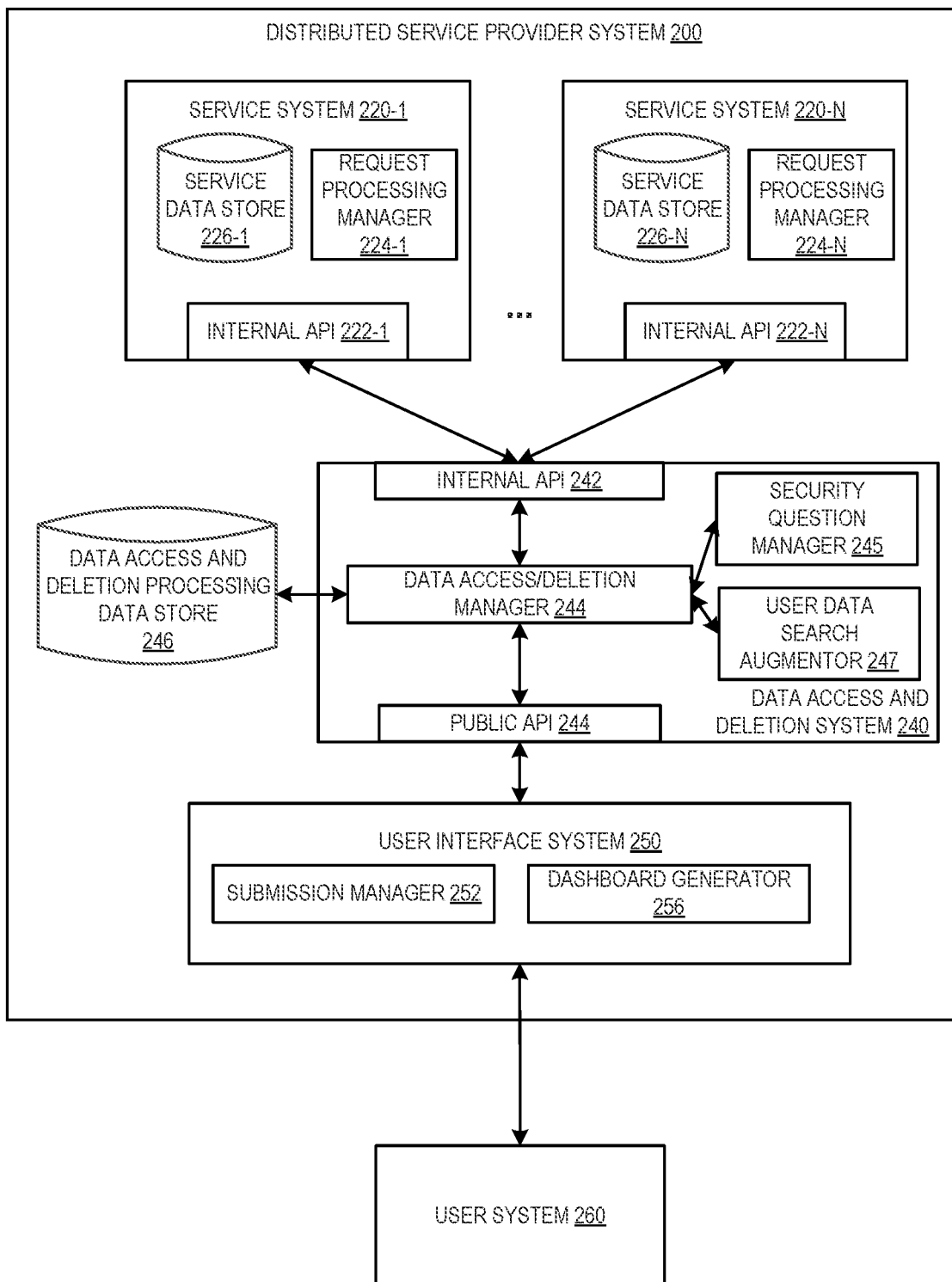
FIG. 2 is a block diagram of one embodiment of a distributed service provider system that provides asynchronous data access and deletion to end users.

FIG. 2 is a block diagram of one embodiment of a distributed service provider system 200 that provides asynchronous data access and deletion to end users.

Figure 8:
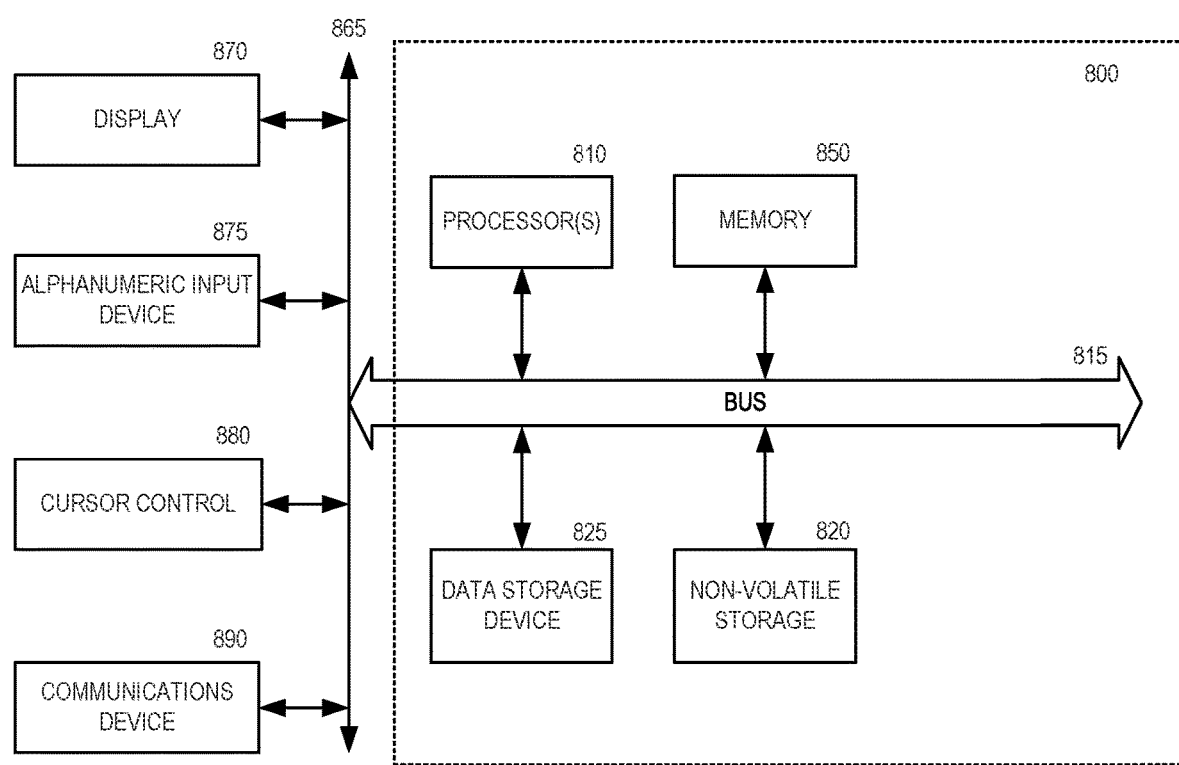
FIG. 8 is one embodiment of a computer system that may be used to support the systems and operations discussed herein.

In the embodiment illustrated in FIG. 2, distributed service provider system 200 includes a data access and deletion system 240, a user interface system 250, a data access and deletion processing data store 246, and a plurality of service systems (e.g., service system 220-1 through 220-N). Each of these systems may be distributed among different physical and/or logical computing device(s). One such computing device is illustrated in FIG. 8 and described below. Furthermore, each computing device may be executed on separate systems and communicate with one another over one or more communications network(s) (e.g., network 102).

Data access and deletion system 240 includes data access/deletion manager 244, which is responsible for interacting with user interface system 250 and each service provider system 220-1 to manage and process user data access and deletion requests, and to provide subsequent data access and deletion updates. However, because each of user interface system 250, and service systems 220-1 through 220-N are distinct systems of the distributed service provider system 200, data access/deletion manager 244 manages user data access and deletion with an asynchronous approach using API based messaging. In embodiments, the approach is asynchronous because data access and deletion requests of a user system 260 are received at user interface system 250 and forwarded as an API based message to public API 244 endpoint. Then, data access/deletion manager 244 uses the internal API 242 endpoint to generate and transmit separate API based messaging requests to each internal API endpoint 222-1 through 222-N of the service systems. The service systems process and respond to the data access and/or deletion requests and provide system answers back to internal API 242 endpoint via an API message in their own time (e.g., some in real time and some after a period of time), making the responses asynchronous with one another. Data access/deletion manager 244 may then provide results indicating what data is stored and/or what data has been deleted to user system 250 via the user interface system 250. This process is discussed in greater detail below.

In an embodiment, user interface system 250 includes submission manager 252 and dashboard generator 256. Submission manager 252 is responsible for generating and transmitting an initial web page based interface to user system 260. The interface is a submission interface enabling any user, regardless of whether the user has an account with distributed service provider system 200, to make a user data access request and subsequent deletion request. In an embodiment, a user of user system 260 submits, via a web based form or other user interface generated by submission manager 252, an initial user identifier. The initial user identifier is also referred to herein, for example, as a global identifier, and may be a user email address, telephone number, social security number, other government issued identifier (e.g., passport number), or other identifier that uniquely identifies a user. Furthermore, in some embodiments, a combination of one or more identifiers may serve as a global identifier, such as a name, date of birth, and zip code obtained and validated from a provided government issued identifier. As discussed below, the user identifier is verified, and then the user is provided with an ephemeral link to dashboard generator 256, which is responsible for providing a dashboard user interface in which a user may make a request for user data stored by distributed service provider system 200, receive updates as to what user data is stored, interact with the dashboard user interface to confirm certain user data, and then subsequently request deletion via the dashboard user interface provided by dashboard generator 256. Furthermore, as will be discussed below, the ephemeral link may continue to be used by user system 260 to access the dashboard user interface to check status of deletion requests, provide additional data access requests (e.g., to confirm inferred user data and/or submit specific data requests as discussed below), during a period of time and/or a number of uses in which the ephemeral link is active. The ephemeral link to the dashboard user interface is associated with a period of time in which the link is active (e.g., a period of 7 days, 15 days, 1 month, etc.) and/or a number of uses (e.g., 5 uses, 10 uses, 25 uses, etc.) with which a user may use the link to access and/or delete their data maintained at distributed service provider system 200. In another embodiment, the link to the dashboard user interface is alive and usable until a set of condition(s) is true, such as a determination that there are no pending data access requests, there are no pending data deletion requests, and period of time has passed (e.g., $T_0$ days since a last data access request finished processing, $T_1$ days since a last data deletion request has finished processing, $T_2$ days since all user data has been deleted, $T_3$ days have passed since the dashboard link was generated, or a combination of time periods). However, once the link expires, the user may submit a new request to obtain a new link to a dashboard user interface, as discussed herein.

Data access and deletion system 240 includes the data access/deletion manager 244, which is responsible for maintaining a state database for a user's access requests and deletion requests (e.g., when each access and deletion request is received and when processing of each request has been completed). The state database is a database entry allocated in data access and deletion processing data store 246. Furthermore, the database entry may be identified and accessible via a unique identifier, such as the user identifier (e.g., telephone number, email address, etc.), a unique identifier associated with the user identifier (e.g., a hash of user data, an encryption key, etc. generated for a user and associated with the user identifier), etc.

After allocation of the database entry, data access/deletion manager 244 is further responsible for managing access and deletion among service systems 220, user interface system 250, and updating the database entry in data store 246 accordingly. Data access/deletion manager 244 includes a public API 244 endpoint for receiving API based messaging via a public facing network from the interfaces generated by user interface system 250 and transmitted to user system 260. Public API 244 endpoint therefore receives user requests via API messages generated by dashboard generator 256 to access data, search for matches to specific user data, and delete data, as discussed herein. The API messages generated by dashboard generator 256 are discussed in greater detail below. Upon an initial request, data access/deletion manager 244 allocates the database entry and establishes the unique ID for the database entry. This unique ID is associated with the original global ID submitted by the user.

Data access/deletion manager 244 then generates and transmits user requests (e.g., access and/or deletion) to each service system 220 of the distributed service provider system 200, and coordinates messaging exchanged with each service system 220. As discussed herein, the messaging, and how each service system 220 responds to requests, is asynchronous as each service system may process requests at different time periods. However, data access/deletion manager 244 updates the database entry to reflect the issuance of each request, what service system the request was sent to, when each request was sent, when a deletion request was received, when a deletion request was forwarded to a service system, when a service system satisfied, a deletion request, as well as any other data used to track issuance and completion of user data access and deletion requests. For example, data access and deletion processing data store 246 may store two or more data collections associated with user data access and deletion requests, such as a collection that contains state information for data requests submitted by a user. Example pseudocode of this collection and information maintained per user entry is provided below in Table 1:

TABLE 1

```
{
    _id:  <int>,  Primary key, auto incrementing, indexed
    created:  <date>,  Date this request was created
    updated:  <date>,  Date this request was last updated
    state:  <string>,  State information of request
    ctype:  <string>,  User ID type. Possible values are email
    and phone.
    cid:  <string>,  User ID value
    auth_token: <string>, A valid auth token is required to view
    the dashboard
    auth_exp: <date>,  Expiry date of the auth token
    access_meta: {
        <string>: {
            created: <date>, Date the data access request was created
            state: <string>, Lifecycle of a Data Request
            updated: <date>, Date the data access request was last
            updated
            error_msg: <string> An error message, if there was an
    error processing this data access request
        },
        ...
    },
    delete_meta: {
        <string>: {
            created: <date>, Date the data deletion request was
            created
            state: <string>, Data deletion lifecycle information
            updated: <date>, Date the PDAD request was last
            updated
            error_msg: <string> An error message, if there was an
    error processing this data deletion request
        },
```

TABLE 1-continued

```
        ...
    }
}
// Indexes
db.cdad.createIndex( { _id: 1 }, { unique: true } )
```

Another collection of data maintained at data access and deletion processing data store 246 is access data. This is a collection of data that contains individual personal information that has been returned by a service system (e.g., in response to an access request). In some embodiments, this personal information is stored as separate data collections, although in other embodiments, the personal information entries can be stored in the collection of Table 1. The returned personal information may be maintained in a collection, such as that shown in Table 2 below:

TABLE 2

```
{
    _id: <int>,  Primary key, auto incrementing, indexed
    req_id: <int>,  ID of the parent data access request
    product: <string>,  Service system that collected this
    personal information
    locality zone: <string>,
    pii: {
        type: <string>,  Type of personal information
        (ex: SSN, address, etc.)
        value: <string>  Value of the PII (ex: 123-45-6789
        representing a SSN)
        ...         // Additional fields that depend on
        the PII type
    }
}
// Indexes
```

In embodiments, the data collections of Table 1 and Table 2 may be maintained in data access and deletion processing data store 246 for a period of time, such as the period of time an access link is valid, and deleted by data access and deletion manager 244 thereafter.

In embodiments, each request of data access/deletion manager 244 is an API based message sent from internal API 242 endpoint to an internal API 221 endpoint of a service system 220. The API based request utilizes internal API endpoints because the messaging occurs over a private network that is not publicly accessible.

In embodiment, each service system 220-1 through 220-N includes the internal API endpoint 222, a service data store 226, and a request processing manager 224. The internal API endpoint 222 is used at each service system to expose the service system to messaging of the data access/deletion manager 244. Furthermore, in embodiments, each service system 220 may store user data for the service/product associated with the service system 220. Since each service system 220 is developed and maintained separately, as its own service/product, the format and storage of user data may be different, as well as the piece of user data being stored. That is, service system 220-1 may store a first set of user data in service data store 226-1 in a first format, and service system 220-N may store a second set of user data in service data store 226-N in a second format. Thus, in embodiments, in order to ensure that each service system 220 is able to receive, process, and respond to user data access and deletion requests, each request processing manager 224 is integrated with a library of functions, the library including functions to search, match, retrieve, and delete user data in a service data store 226.

Furthermore, the user data stored in a service data store is annotated with certain data fields that are recognizable by each of the library functions, enabling each function executed by a request processing manager 224 to operate on its associated various service data stores 226. For example, user data maintained within a service data store includes annotations:

data_subjects—to specify the category of the data owner. For data access requests, this annotation is used to enable filtering out data that is not subject to user data access and deletion, or is subject to data access and deletion product_id—which enables one of a list of values naming a product associated with the service systems storing the data.

db_type—for specifying a type of database in which data is stored.

collection/table—depending on db_type, the name of a collection or table.

owner_prop/data_owner—this annotation points to the prop/column in the collection/table.

sensitivity/pii—these are field level data annotations that specify the various categories of personal data (e.g., PII) that are supported.

validation status—this is a field that indicates whether certain user data has been validated prior storage by a service system (e.g., some services may interact with $3^{rd}$ party systems (not shown) that supply user data that is either not validated or not sufficiently validated by the $3^{rd}$ party systems prior to receipt by system 200).

Then, the libraries integrated into a service's request processing 224 is able to search for user data using one or more of the annotations. Thus, the request processing 224-1 uses the library functions with relevant information as arguments, to search data. As a result, the integration of the library functions leverages the annotations to minimize integration efforts at each service system 220.

That is, for accessing user data, when data access and deletion system 240 forwards an access request to each service system 220-1 through 220-N, the request provides: the user ID type, the user ID itself, and a product ID. In an embodiment, using the annotations, the integration library functions integrated into request processing 224 iterates through all collections and/or database tables and filters out the ones where, for example: data_subject='end_user' and product_id='<product_id>'. In some embodiments for example, for each collection or table, the library then performs: select * from <collection> where <owner_prop>='<cid>'. Furthermore, in some embodiments, the integration library functions may build a flattened table that joins together multiple data tables to allow a query such as that mentioned above. However, the above is an example of how data might be queried, and in other embodiments, distributed system deployments, database system formats, etc., other forms of data queries may be performed against one or more data tables to obtain query results based at least in part on a user identifier. Then, for each document or table row that is returned, the library extracts personal information using sensitivity annotations. Finally, the library functions enable the request processing 224 to return the aggregated results back to data access and deletion system 240 via an API message exchanged via internal endpoints 222 and 242.

Then, for deletion of data, all request processing 224 of the service systems 220 use the integration libraries to ensure that data deletion requests are fulfilled correctly. The libraries take into account legal holds and mandatory retention requirements for anti-fraud (e.g. AML) reasons. In embodiments, the data annotations are again used to support the library functions implementing data deletion, with the user ID data, data type, personal information type, etc., annotations indicating specific user data to be deleted. Again, the library functions enable the request processing 224 to return the data deletion results back to data access and deletion system 240 via an API message exchanged via internal endpoints 222 and 242.

Upon receiving a response to a data access and/or deletion request, data access/deletion manager 244 updates the database entry in data store 246 to reflect the updated status of a user's data access and deletion requests.

Then, when via dashboard generator 256, a user requests a status update and/or accesses a front facing dashboard user interface to monitor their data access and/or deletion request, dashboard generator 256 may request via public API 244 endpoint for access/deletion records associated with a user. Then, the dashboard user interface can be updated with the appropriate status.

Because there are security considerations with the handling of sensitive user information, in embodiments, distributed service provider system 200 is configured to ensure service availability, prevent phishing, ensure secure authentication, and avoid leaking sensitive data. These mitigations are discussed in greater detail below.

Figure 3:
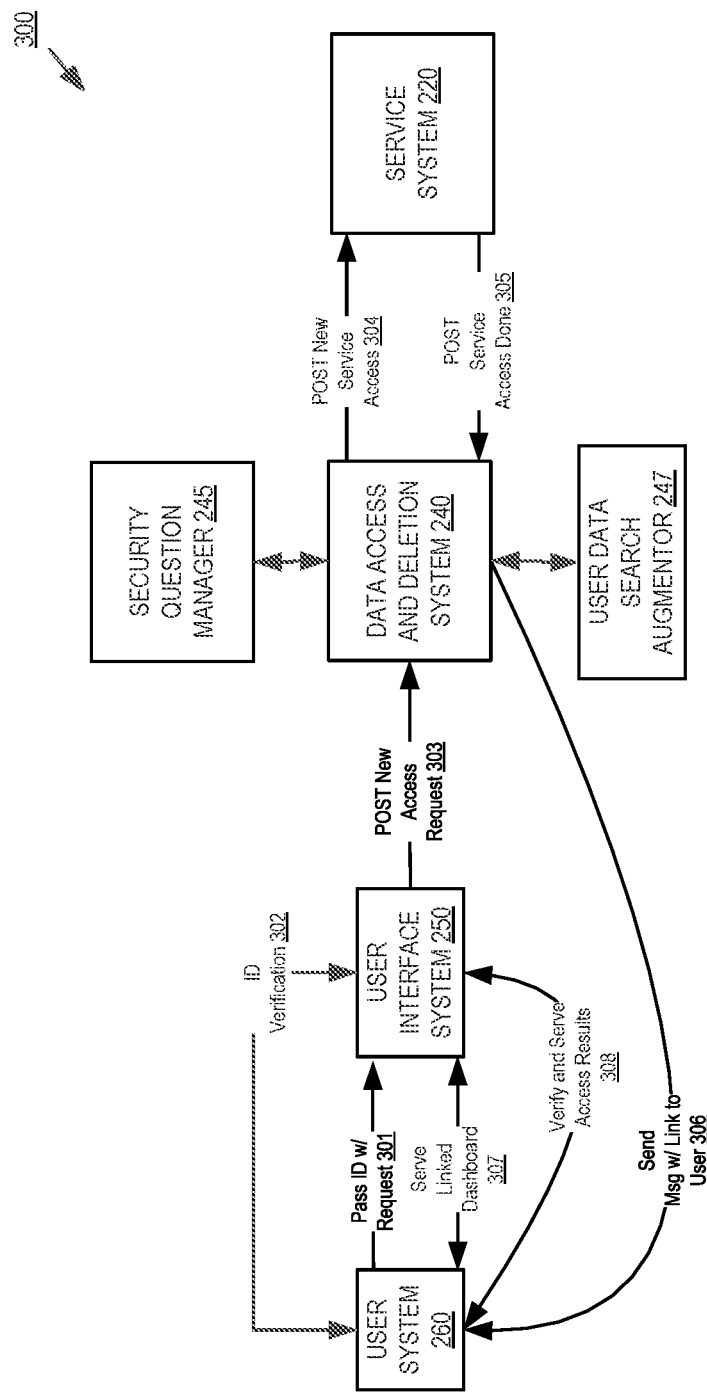
FIG. 3 is one embodiment of a process for a distributed service provider system providing data access to an end user.

FIG. 3 is one embodiment of a process 300 for a distributed service provider system providing data access to an end user. The process 300 is performed by processing logic that may comprise hardware (circuitry, dedicated logic, etc.), software (such as is run on a general purpose computer system or a dedicated machine), firmware, or a combination. In one embodiment, the process 300 is performed a distributed service provider system (e.g., user interface system 250, data access and deletion system 240, and a service system 220, as discussed in FIG. 2).

Referring to FIG. 3, processing logic of the user interface system 250 begins by receiving a user system 260 request 301 to access user data associated with a user ID (e.g., telephone number, phone number, etc.) passed with the request 301. In particular, a submission manager 252 generates a user interface, such a web page, in which a user of user system 260 can enter a user identifier (also referred to as a global user ID). Furthermore, the user interface generated by submission manager may include a CAPTCHA™ in the user interface to prevent bots or other automated attacks, such as phishing. Furthermore, submission manager 252 may rate limit devices that it interacts with via device IP address.

Upon receiving the request 301, user interfaces system 250 performs ID verification 302 by sending a verification code to the email or phone number associated with request 301. The sending of the verification code to the submitted user ID is to confirm that the user submitting the request has access to the device and/or account associated with the submitted email phone number. The device may be the same of different device as user system 260. Furthermore, the verification code usage prevents scripts, bots, hackers, or other nefarious actors from exploiting this tool for distributed denial of service attacks.

User interface system 250 then makes a POST new access request 303 to the data access and deletion system 240. In embodiments, data access and deletion system 240 creates a new access request record for each email and/or phone received. That is, for each user ID (email or phone), data access and deletion system 240 creates and initializes a new entry in the state database (as discussed in FIG. 2). Table 3 below shows pseudocode of an API POST message that can be transmitted from user interface system 250 to the public API endpoint of data access and deletion system 240:

TABLE 3

POST /cdad/access/new HTTP/1.1
{
  "emails": ["jdoe@address.com", . . .],
  "phones": ["+12345678901", . . .],
  "verification_codes": ["123456", . . .]
}

In the example pseudocode, API message includes one or more of the user ID (e.g., email and/or phone number) in the POST message sent to the public API endpoint of data access and deletion system 240. In embodiments, the POST message may also include the code sent to the user during verification so that a verification can be performed that the user received the code at the contact point (e.g., phone number, email address, etc.). Furthermore, in some embodiments, only verified user identifiers are submitted with this POST request, to prevent attackers from using a compromised identifier to expand to obtain other non-verified identifiers. For example, an example user Eve, who has control over phone number 555-1234 and has verified that phone number, cannot then also send a non-verified email address (e.g., bob.smith@example.com for example user Bob to also harvest Bob's data. That, is the POST message will not allow non-verified identifiers to be included. Furthermore, user interface system 250 transmits a message back to user system 260, the system identified in the access request, and/or updates the user interface in which the access request was generated that the data access request has been received, and the user will receive a second communication (e.g., email, text message, SMS message, MMS message, etc.) once the access request has finished processing by distributed service provider system.

Data access and deletion system 240 then generates and transmits a POST new service access request 304 to each service system by calling POST /server/service/access/new, with is an API based message sent from the private API endpoint of data access and deletion system 240 to each private endpoint of the service systems 220. An embodiment of example pseudocode for the POST new service access request 304 is shown below in Table 4:

TABLE 4

POST /cdad/product/access/new?req_id={id}&ctype={ctype}&cid={cid} HTTP/1.1

As shown in the pseudocode, the message includes fields, such as the req_id that passes the access request identifier (e.g., an ID associated with the new user data access request), the ctype that passes the type of user ID (e.g., email, phone number, or other user identifier), and the cid that passes the user ID itself.

Each service system, such as service system 220, fulfills the access request for the data that they collect. In particular, a request processing manager, using data access and deletion functions of a software library integrated into the request processing manager, performs a search using the fields in the POST message. As discussed above, the data records stored by service system 220 are annotated, and the library functions are configured to search for those annotations to locate user data associated with the original access request. The results are then returned 305 to data access and deletion system 240 (e.g., via a private API endpoint to private API endpoint message), such as POST /server/internal/access/done. Example pseudocode of the POST message is shown in Table 5 below:

TABLE 5

```
POST /server/internal/access HTTP/1.1
{
  req_id: 1234,
  service: "service name",
  status: "success",
  error_msg: "",
  data: [
    {. . .}, // unredacted PII (including locality zone)
    {. . .},
  ]
}
```

In embodiments, the request body includes a req_id that identifies the access request to which the message belongs, the service that generated the response, a status to indicate success (e.g., user data found or not found) or failure (e.g., an error or other exception) of the access request, and the data found by the access request. Data access and deletion system 240 tracks the state of each data access request and buffers the results in the state database maintained for the user's data access request.

In some embodiments, data access and deletion system 240 further seeks to augment the user data. That is, in some embodiments, a service system may store user data (e.g., the user of user system 260) but does not identify or key the data to the received user identifier. For example, a service system may provide a product that does not collect a phone number or email address to perform the service associated with the service system. This service system, however, still stores user data which should be discoverable by data access and deletion manager 240. Thus, in embodiments, user data search augmentor 247 is employed by data access and deletion manager 240.

User data search augmentor 247 is responsible for monitoring that user data returned by the initial queries of data access and deletion system 240. The returned data is then used to build additional user data queries that are sent to and executed by each service system 220 as discussed above. Each additional user data query includes a subset of user data where the subset is predetermined as being highly probative of being used to identify and distinguish specific users. That is, each subset of user data is a form of secondary user identifier. For example, subsets of user data may include $S_1$={date of birth, gender, zip code}, $S_2$={physical address, age}, $S_3$={social security number}, $S_4$={bank account number, home address, IP address}, to $S_n$={user_date$_1$ . . . user_data$_m$}, that enable a service system 220 to search for additional user data that may be stored by the user system and not including the received user identifier.

In embodiments, the total number of subsets (e.g., 2 subsets of user data, 3 subsets of user data, etc.) of user data and combinations of user data forming each subset are determined based on identification likelihood value (e.g., how likely is a specific subset to uniquely identify a specific user), coverage (e.g., how likely is it that user data queries including the initial user identifier based queries and certain subsets $S_i$, $S_j$, and $S_k$ are likely to capture X % of user data stored by service systems), as well as processing resource considerations (e.g., an incremental improvement of coverage by including queries using subsets S q and Sp may be avoided as their incremental improvement of coverage would disproportionately consume processing resources at service systems). Furthermore, in embodiments, each individual piece of user data forming a subset may not necessarily itself be highly probative (e.g., a birthday may be shared multiple users, multiple users may reside at the same zip code, etc.), but when combined with one or more additional pieces of data (e.g., phone number, social security number, etc.), the combination becomes highly probative.

Thus, user data augmentor 247 monitors the responses 305 of the service systems to fill out the selected subsets of user data for the additional augmentation user data queries. As the predetermined subsets of user data are formed (e.g., all user data for forming subset $S_i$ has been returned), the additional user data query(ies) may be transmitted 304 to each service system 220. Then, the responses 305 of these additional queries and any additional found user data may augment the database and state tables being maintained by data access and deletion system 240 for the user. For example, the initial query of data access and deletion system may use an initial identifier, such as alice.smith@example.com. Returned data from an example service system A that is associated with the initial identifier may include a date of birth and a phone number, both of which have been verified but were not submitted with the current data access request. Then, although a service system B does not return data in response to the initial query, a secondary user identifier formed from the date of birth and phone number may be used to further query example service system B. That is, the two pieces of user data (e.g., date of birth and phone number) may be considered as highly probative for user identification purposes, and having been previously verified, can form the secondary query to discover further data, such as data at service system B, service system A, or other service systems, that are linked to that combination of user data.

Once data access and deletion system 240 has received the results for all service systems (e.g., a message 305 from each service system), it transmits 306 user system 260 (or user system identified in the access request) an email, text message, SMS, MMS, etc. containing a link to a dashboard user interface. The dashboard user interface is a second user interface in which a user may view data access request status and results. The message 306, in embodiments, advises the user not to share the link with anyone since, as will be discussed below, the link provides access to the dashboard user interface in which the user is able to delete data.

User interface system 250 then receives 307 user link selection of the link sent in 306. The user link selection enables user interface system to generate and transmit 307 the dashboard user interface to user system 260. In embodiments, the link is ephemeral and expires as discussed herein.

However, in embodiments, prior to transmitting access status results regarding an identity of user data stored by the distributed service system, user interface system 250 verifies and authenticates the user of user system 260. In embodiments, a series of security questions are generated by security question manager 245, and a selected number of those questions are transmitted 307 to the user system 260. The user of user system 260 is then required to respond correctly to the security questions before showing any results of the access request. In embodiments, these security questions depend on the results of the access request (e.g., use the access request results to verify the user knows the data, which verifies the user's identity). That is, the security questions are based on data known to distributed service provider system 200, such as personal identification information (PII), transaction information, or a combination thereof selected by the security question manager 245 to ensure veracity of the user's identity. Furthermore, the series of questions provides an extra layer of security to ensure that the user is the true owner of the data being returned without requiring account establishment. Table 6 below shows a listing of personal information (PII), a sensitivity level associated with the PII, how PII might be asked, the PII in redacted form so as not to expose the user's full information, and then how the security question is posed to the user in redacted form. In embodiments, this is an example listing and other PII, redactions, question forms, etc. may be used consistent with the present description.

passed at operation 301. Forms of dynamic user data include, for example, a dollar amount of a charge processed by a service system of the distributed service provider system, a bank account balance on a given data when a service system of the distributed service provider system is connected with a user's bank account, a transaction detail of a transaction processed by a service system of the distributed service provider system, as well as other forms of data known by services, and which should be known to the true owner of the ID passed by user system at operation 301. In embodiments, these forms of dynamic data provide highly probative value with respect to user identity verification because they are time sensitive (e.g., charge, balance, transaction detail, etc. exist within a set period of time, such as a prior day, week, month, etc.), are hard to guess and not publicly available (e.g., using a charge amount of $182.66 processed on Apr. 5, 2022 for an access request submitted on

TABLE 6

| Sensitivity Level | PII | Redacted Form | Example | Security Question |
|---|---|---|---|---|
| 0 | Facial Image | | A picture of your face | N/A |
| 0 | SSN | | Your SSN | Confirm your SSN: ___-___-___ |
| 0 | Gov't Issued ID Number* | Your [country] [id] | Your Canadian passport | Confirm your Canadian passport number: _____ |
| 1 | (Bank) Account Number | Your [institution] account ending in [last 4 digits] | Your Bank account ending in 9380 | Confirm your Bank account number: _____9380 |
| 1 | Card Number | Your card ending in [last 4 digits] | Your card ending in 9770 | Confirm your card number: _____9770 |
| 2 | Address | Your address on [street], [country] | Your address on Fillmore St, USA | Confirm your address: _____ Fillmore St, USA |
| 3 | Phone Number | Your phone number ending in [last 4 digits] | Your phone number ending in 7728 | Confirm your phone number: (___) ___ - 7728 |
| 3 | Email | first & last letter of username + domain | m•••••n@mail.com | Confirm your email: m____n@mail.com |
| 4 | IP Address | [count] IP address(es) | 4 IP addresses | N/A |
| 4 | DOB | | Your date of birth | Confirm your DOB: ___/___/___ |
| 4 | Name | [count] name(s) | 3 names | Enter in all names you go by: _____ |

In embodiments, the security level is indicative of how sensitive the PII is with respect to a user's identity. Thus, the more sensitive the personal information, the more likely that a correct response of a user to a security question associated with that PII is indicative of veracity of the user's identity. For example, a user's SSN is much less likely to be known by a nefarious action, whereas a user's date of birth may be publicly available information. In embodiments, the security level may therefore be used to select specific PII providing a maximum indication of veracity (e.g., by a selection by the security question manager 245) of returned PII having the most probative value with respect to user identity. Thus, security questions may be determined and selected to maximize the likelihood that a user submitting a data access request is the owner of the ID passed by user system 260 at operation 301.

In other embodiments, distributed service provider system 200 may store (with the data returned and/or used by service systems 220) additional forms of user data probative for verifying a user identity. For example, dynamic user data may be used to determine if a user is the owner of the ID Apr. 13, 1922), the pool of potential dynamic user data changes over time making such data hard to guess and/or obtain by a nefarious actor (e.g., as a user's bank balance changes from day to day, as a user makes new charges, as a user performs new transactions, etc.).

Another benefit to using such dynamic user data is that this data is low value to nefarious actors, and there is low user risk as a result of unexpected exposure (e.g., a nefarious actor would gain very little user information if they obtain data indicating the user charged $182.66 on Apr. 5, 2022). In embodiments, security question manager 245 may therefore obtain and select one or more dynamic user data for the security questions selected and transmitted 307 to the user system 260. Additionally, low veracity dynamic user data may be filtered out by security question manager 245, such as identification and filtering out of charges or balances below a predefined amount, filtering out of recurring charges (e.g., a common subscription amount), as well as other low veracity dynamic data. Thus, in embodiments, security question manager 245 is able to repurpose dynamic user data, which is not typically associated with user identification, already known to distributed service provider system 200, is of low consequence if exposed, and is of high probative value of a user's identity, to provide a low risk and strong user identity verification prior to providing access to potentially sensitive user data.

In embodiments, security question manager 245 may prioritize dynamic user data over the PII in Table 6. However, in embodiments, a mix of dynamic user data and PII from Table 6 may be selected, such as a predetermined number of dynamic user data, and a predetermined number of PII based on priority level, selected by security question manger 245 to fill the total number of questions to be asked of the user of user system 260. Furthermore, in embodiments, security question manager 245 makes the selection of dynamic user data and/or PII in a deterministic fashion (e.g., a predefined order, priority listing, mapping of most to least preferred forms user data, etc.) to ensure consistency of questions asked, for example, if a user accesses their information at distributed service provider system 200 at different times.

Then, in embodiments, a series of questions may be asked of the user to verify their data using the selected dynamic user data and/or PII of Table 6. When a predefined number (e.g., 1, 2, 5, etc.) are answered correct by the user via the dashboard user interface, the user is deemed to be verified. Furthermore, to avoid exposure of the user's data, the security questions may be asked in an order corresponding to the sensitivity level, staring lower and only increasing as needed, asking dynamic user data questions before PII questions, etc. After verification, the user is presented with the access results within the dashboard user interface. Furthermore, after verification, the user is not required to re-verify their PII to view the status of their access results in the dashboard user interface.

As discussed in greater detail below, however, each data deletion request will cause the user to reverify their identity. However, in some embodiments, the same series of verification questions used to verify the user for providing access (e.g., operation 308) are re-used to verify the user for making subsequent data deletion requests.

Figure 4:
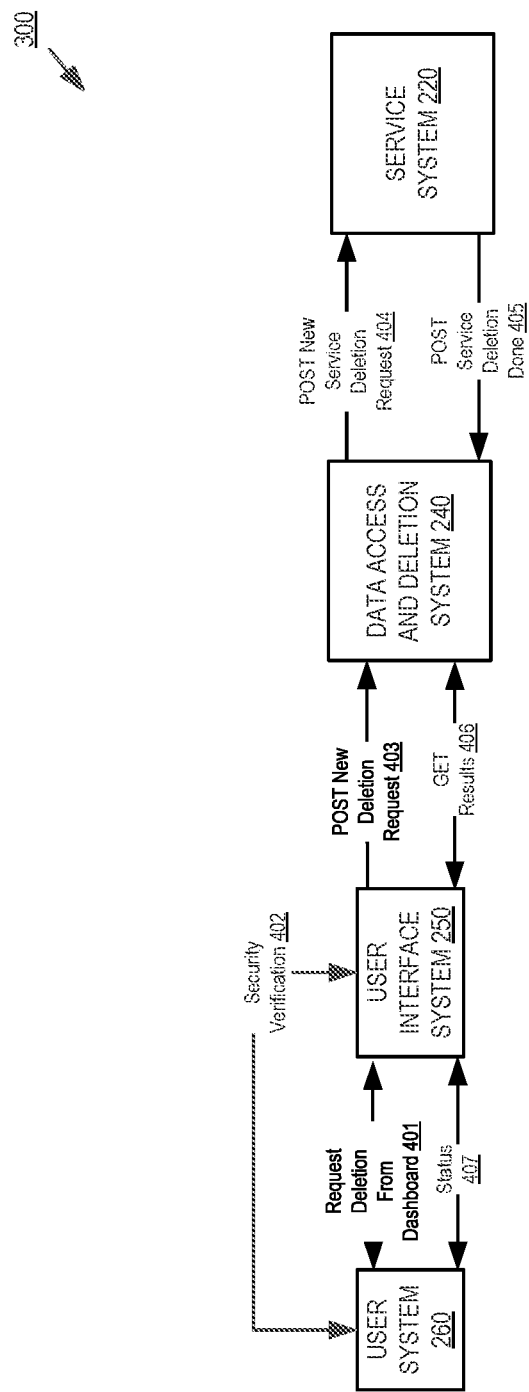
FIG. 4 is one embodiment of a process for a distributed service provider system providing data deletion to an end user.

FIG. 4 is one embodiment of a process 400 for a distributed service provider system providing data deletion to an end user. The process 400 is performed by processing logic that may comprise hardware (circuitry, dedicated logic, etc.), software (such as is run on a general purpose computer system or a dedicated machine), firmware, or a combination. In one embodiment, the process 400 is performed a distributed service provider system (e.g., user interface system 250, data access and deletion system 240, and a service system 220, as discussed in FIG. 2).

Referring to FIG. 4, processing logic of the user interface system 250 begins by receiving a user system 260 request 401 to access the dashboard user interface. In embodiments, the user request is received via link selection form the email, text, SMS, MMS, etc. sent to the user after verification discussed in FIG. 3. The dashboard user interface is returned 407 showing a status of all access and deletion requests, as well as what user data is stored by the distributed service provider system (e.g., as determined above with a record of such data stored in the user data store).

From the user interface, deletion of one or more user data may be requested using the dashboard user interface 401. As discussed above, if this is the first time the user is accessing the dashboard user interface, the user must correctly answer security questions before the dashboard user interface is rendered, as discussed above in FIG. 3. Any deletion request submitted at this point will be immediately accepted. However, if this is not the first time the user is accessing the dashboard (e.g., they have closed the dashboard user interface, and have later re-accessed the dashboard user interface by re-selecting the link), user interface system 250 re-performs verification 402 of the user by again requiring the user to correctly re-answer the security questions in order for deletion requests to be accepted. In embodiments, the deletion request includes a user selection of one or more pieces of user data indicated in the dashboard user interface.

In response to a deletion request, user interface system 250 generates and transmits 403 a POST/server/deletion/new request to the public API endpoint of the data access and deletion system 240. Pseudocode of the body of the POST message is shown below in Table 7:

TABLE 7

POST /cdad/delete/new?req_id={id}&auth={token}&service={s0,s1,..., sN} HTTP/1.1

The body of the POST/server/deletion/new request message includes parameters, including req_id that identifies the request and was generated above as discussed in FIG. 3, an authentication token also discussed above in FIG. 3, a list of services to which user data deletion is requested (e.g., the services identified in FIG. 3 as having stored the user data requested to be deleted, as maintained in state database record within the data store 246). In embodiments, upon sending the request to data access and deletion system 240, user interface system 250 may further update the status 407 of the user data record by indicating "We have begun the process of deleting your data," providing a per-service status (e.g., deletion request generated, deletion request fulfilled, or other status). Furthermore, the state database entry/table generated for the user is updated with the deletion requests.

Data access and deletion system 240 forwards the deletion request to each service (e.g., those listed in the POST message 403) from the list of services to which user data deletion is requested. In an embodiment, the data access and deletion system 240 generates and transmits one or more POST /cdad/service/deletion/new message(s) between internal API endpoint 242 and each of the endpoint(s) 222 from the list of services to which the data deletion request is to be sent.

TABLE 8

POST /server/service/deletion/new?req_id={id}&ctype={ctype}&cid={cid} HTTP/1.1

The POST message body includes data including the req_id identifying the access request ID, ctype identifying the type of user data (e.g., email, phone, or other universal user ID), and cid identifying the user identifier itself (e.g., "user@address.com"). This information enables the service (request processing manager) to use the integrated libraries discussed herein to search and/or access the data entries using annotations keyed to the user identifier, and then delete the associated data. In some embodiments, the deletion request received by a service is also forwarded to any third party systems (not shown) that the service may send user data to in order to complete the service's functions. used Upon each service system 220 completing data deletion (and optimally receiving confirmation from a third party system of data deletion), the service system 220 reports 404 back to data access and deletion system 240. The report is in the form of a generated and transmitted POST /cdad/internal/deletion/done message transmitted between internal API endpoints, and reports the results of a previously submitted data deletion request. Table 9 below illustrates an embodiment of the body of the POST /cdad/internal/deletion/done message:

TABLE 9

POST /server/internal/deletion/done HTTP/1.1
{
  req_id: 1234,
  service: "service_ID",
  status: "success",
  error_msg: "",
}

The body includes data fields, including the req_id, service identifier, and the status of the deletion request (e.g., success or error, and if an error message whether the service encountered the error, a third party encountered the error, or another type of error occurred). The deletion status for the service is then updated by data access and deletion system 240 in the state database table with the status.

If the user has verified themselves to the user interface system 250 and the dashboard user interface is displayed, then it may be updated 406 with the new status 407 to reflect deletion status at one or more service systems 220. However, the user may periodically check on their status by re-accessing the dashboard user interface with the link discussed above. Upon link selection, or periodically, user interface system 250, in order to render an up-to-date dashboard user interface, generates a POST a GET/results API based message to the public API endpoint of the data access and deletion system 240. Table 10 shows an embodiment of the GET message:

TABLE 10

GET /cdad?req_id={id}&auth={token} HTTP/1.1

The body of the message include the req_id associated with the original access request, and identifying the entry in the database state table to which the request applies. Data access and deletion system 240 responds to this request with a message, an embodiment of which is shown below in Table 11:

TABLE 11

** PRIVILEGED AND CONFIDENTIAL **

200 OK
{
  "req_id": 123,
  "ctype": "phone",

TABLE 11-continued

** PRIVILEGED AND CONFIDENTIAL **

"cid": "+1415124567",
  "created": 12345, // epoch
  "updated": 12345,
  "state": "VERIFIED",
  "access_meta": {
    "service": {
      "created": 12345,
      "updated": 19999,
      "state": "SUCCESS",
      "data": [
        {"type": "ssn", "value": "xxx-xx-1234"},
        ...
      ],
    },
    ...
  },
  "delete_meta": {
    ...
  }
}

The response message, in the illustrated embodiment, includes the status for each user data type found during the access request, as well as deletion status of requested deleted data. Furthermore, the message includes a status, which is shown using indicator 200 OK indicating the GET request is successful. Other statuses are possible, such as 400 Bad Request indicating that the req_id is invalid, 403 Forbidden indicating that the authorization token is invalid, 404 Not Found if the req_id is not found in the state database.

Therefore, as discussed above, an extensible technique for accessing and deleting user data in a distributed service processing system is described. The system is extensible to new services added to the distributed system, and makes data access and deletion integration by such services easy through data annotation and libraries, which when the library functions are integrated into the services, enable search and deletion of data based on the annotations, as discussed above. Furthermore, the data access and deletion is managed and tracked via centralized system enabling accurate tracking and updating of the of the data access and deletion requests. Still further, the system is easy for a user to user, as the system does not require the establishment of any user account, while at the same time securing the privacy and integrity of user data.

The embodiments above are discussed with the assumption that each service collects specific global user identifiers (e.g., an email address or telephone number). However, in some embodiments, one or more services do not collect and/or do not key user data to this user identifier type. This may be the result of the service being provided, how a user is signed up for that service, or other reasons. In this embodiment, the distributed service provider system 200 would still want to provide user data access and deletion services. Thus, in embodiments, the distributed service provider system performs additional processes to confirm user data stored at one or more services, and may also infer additional user data stored at one or more services. The confirmable and inferential user data is then associated with a user access request within a relevant database state table as discussed above, and further subject to data deletion requests as discussed above. Thus, the processes discussed below, enable the discovery of additional user data within the data stores of services to ensure all user data is found when a user is seeking to access and/or delete their data from distributed service provider system.

Figure 5:
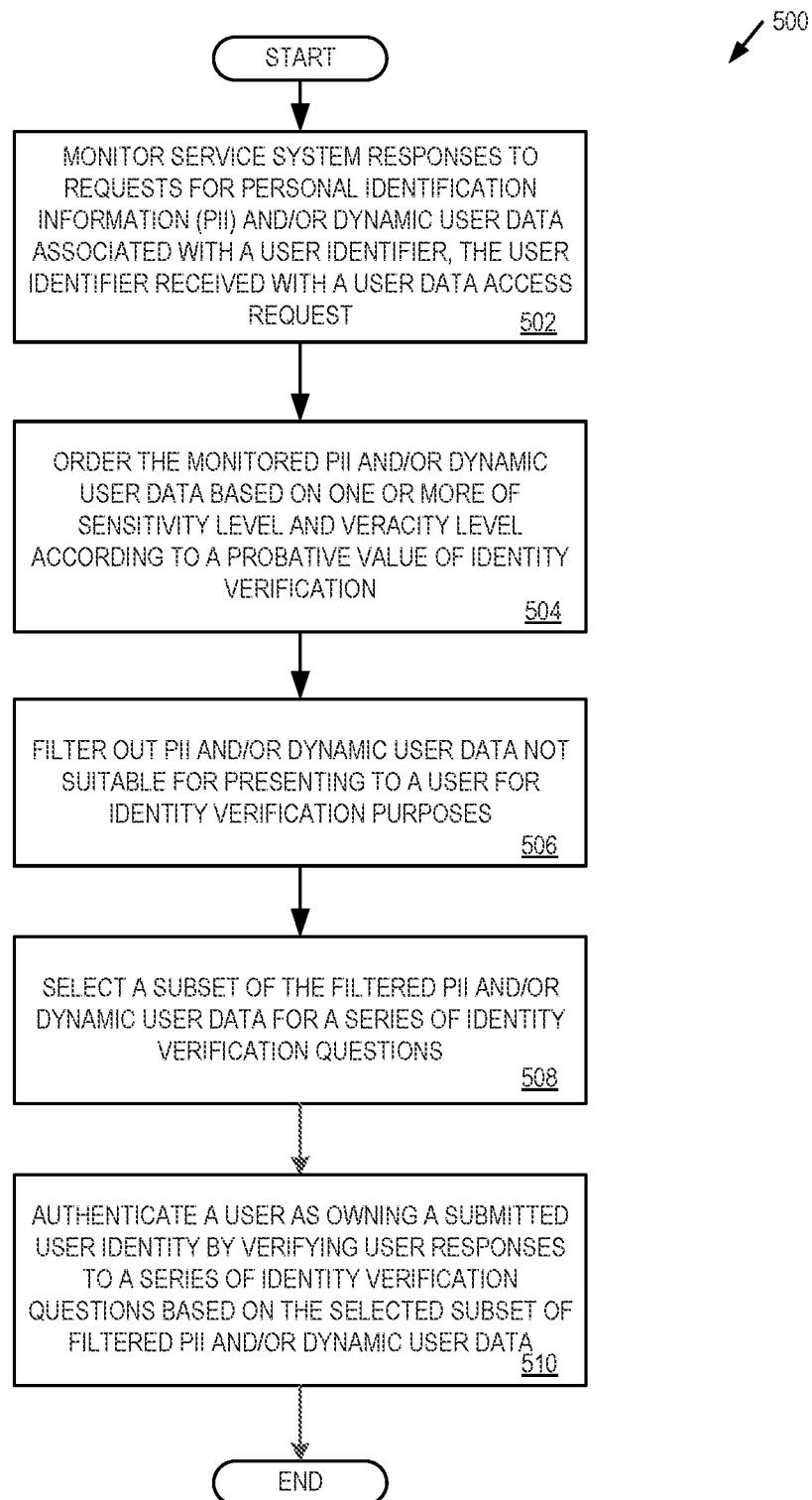
FIG. 5 is one embodiment of a process for a distributed service provider system generating prioritized security questions to authenticate the identity of a user request requesting user data is stored by the distributed service provider system.

FIG. 5 is one embodiment of a process for a distributed service provider system generating prioritized security questions to authenticate the identify of a user request requesting user data is stored by the distributed service provider system. The process 500 is performed by processing logic that may comprise hardware (circuitry, dedicated logic, etc.), software (such as is run on a general purpose computer system or a dedicated machine), firmware, or a combination. In one embodiment, the process 500 is performed by a security question manager 245.

Processing logic begins by monitoring service system responses to requests for personal identification information (PII) and/or dynamic user data associated with a user identifier, the user identifier received with a user data access request (processing block 502). In embodiments, processing block is initiated after ID verification discussed above in FIG. 3. Furthermore, as discussed in FIG. 3, following ID verification, asynchronous data access requests are processed by a data access and deletion request at a plurality of service systems. The service systems return user data associated with the ID and/or inferred as being associated with the ID (discussed below). The returned service system data may include a combination of PII (e.g., Table 6 type user data, as well as other forms of PII) and dynamic user data (e.g., specific user data known to the distributed service provider system (e.g., charges of specific amounts, dates, locations, etc., bank account balances on given days, transaction attributes for a distributed service, etc.).

Processing logic then orders the monitored PII and/or dynamic user data based on one or more of sensitivity level and veracity level (processing block 504). In embodiments, processing logic orders the PII and/or dynamic user data to form an initial set of user data that ranks the different forms of user data according to predictive value for correctly correlating a received user ID (e.g., operation 301 from FIG. 3) with the actual owner of the user ID and not a nefarious actor. For example, in an embodiment where only PII is monitored by processing logic, then the more sensitive information is ranked ahead of less sensitive information since the more sensitive information provides a greater degree of probative value for predicting a user's identity. The ranking may also be based on additional factors, such as a veracity level. For example, in some embodiments, where both PII and dynamic user data are monitored by processing logic, dynamic data is ranked ahead of sensitive PII to prioritize the level of veracity provided by the dynamic user data. In these embodiments, the dynamic user data (e.g., a charge of $754.01 on Apr. 2, 2022) provides a highly probative value for predicting a user's identity as such information is time bound, likely only known to the user, hard to discover, and hard to predict as a security question given the large pool of such dynamic data. Furthermore, processing logic has easy access to dynamic user data as service system data. Thus, in some embodiments, where both PII and dynamic user data are monitored, the dynamic user data is ranked ahead of the PII as providing a greater level of probative value of a user's identity, and to prioritize the low risk of loss. However, in some embodiments, some forms of PII may be ranked ahead of dynamic data to provide a mix of data types for user identity verification. In any embodiment, as discussed herein, the ranking is deterministic and stable (e.g., predefined based on a mapping, data table, set of rules, order of selected questions, etc.) so that the ranking returns the same results if a user later returns to access their data, such as after an access link expires. The deterministic and stable ranking also prevents refreshing a page to obtain new/different questions. That is, for example, if two security questions (A and B) both have the same sensitivity and veracity levels, the deterministic and stable ranking may, for example, rank A before B. Then, even if a user returns later, refresh a user interface, forms a new query, etc., question A would continue to rank before B.

Processing logic then filters out PII and/or dynamic user data not suitable for presenting to a user for identity verification purposes (processing block 506). In embodiments, one or more monitored PII and/or dynamic user data may be unsuitable for identity verification purposes. For example, a user's IP address may be returned as PII. However, the IP address may be difficult for a user to determine, be a dynamic IP address that changes, and/or is publicly obtainable information that is potentially known to others, which makes using IP address at best of low probative value (e.g., given the ability for non-users to determine the data) and more importantly hard for the user to determine. As another example, low value and/or recurring charges may be unsuitable forms of dynamic user data, as these are easier for a non-user to predict (e.g., a charge to a music streaming service is the same amount regardless of user and may be incurred on the same date by different users). Such low probative value user data, difficult to determine user data, etc. may therefore be excluded from ID verification questioning to reduce the initial set of user data.

Processing logic selects a subset of the filtered PII and/or dynamic user data for a series of identity verification questions (processing block 508). In embodiments, the selection selects a predetermined number of the ranked and filtered PII and/or dynamic user data corresponding to a number of identity verification questions to be asked of a user. The number may be a static number, such as positive integer greater than or equal to 1 (e.g., every user seeking access to their data is asked three security questions). Furthermore, the number may be greater than the number of security questions to be asked, for example, to give the user the opportunity skip one or more questions. In some embodiments, the number of PII and/or dynamic user data may itself be dynamic, for example in response to an ongoing condition of the distributed systems (e.g., if an attack has been detected, an increased number of user data may be selected for asking an increased number of questions), in response to a potential location of a user (e.g., a user's location from returned PII is associated with an area of increased fraud, and/or a location of a user system seeking access to user data is in an area associated with increased fraud), based on whether a user identifier is associated with a past failed verification (e.g., a user seeking to verify a submitted identification previously failed), as well as other conditions that may give rise to a need for increased security). Note that because the ranking and filtering is deterministic, the selection of processing block 508 will select the same data for the same identifier at different time, subject to changes in dynamic data and/or a number of user data selected.

Processing logic then authenticates a user as owning a submitted user identity by verifying user responses to a series of identity verification questions based on the selected subset of filtered PII and/or dynamic user data (processing block 510). As discussed herein, the series of identity verification questions are generated and transmitted to a user system via a dashboard user interface. The user interface provides partial information (e.g., "Verify social security number ___-___-1234") and/or requests supply of a requested data (e.g., "What was the amount of the charge on the card ending in 1234 on April $5^{th}$ at Store X?") in the series of questions, and based on user responses authenticates the user as the owner of a submitted identifier when a predetermined number of security questions have been correctly answered. The user is referred to as the owner because the user correctly answering the security questions is determined to be the actual user associated with the supplied user ID.

Therefore, processing logic is able to security authentic an identity of a user of a remote system. Furthermore, because processing logic has access to the different types of user data available to the distributed services system, a strong authentication can be made, while at the same time minimize risk of exposure of sensitive user data. Each of these is extremely important in modern networked computing environments where remote systems may not be who they claim to be, exposure of user data to improper parties is to be avoided, and sensitive user data is to be provided to the authenticated user.

Figure 6:
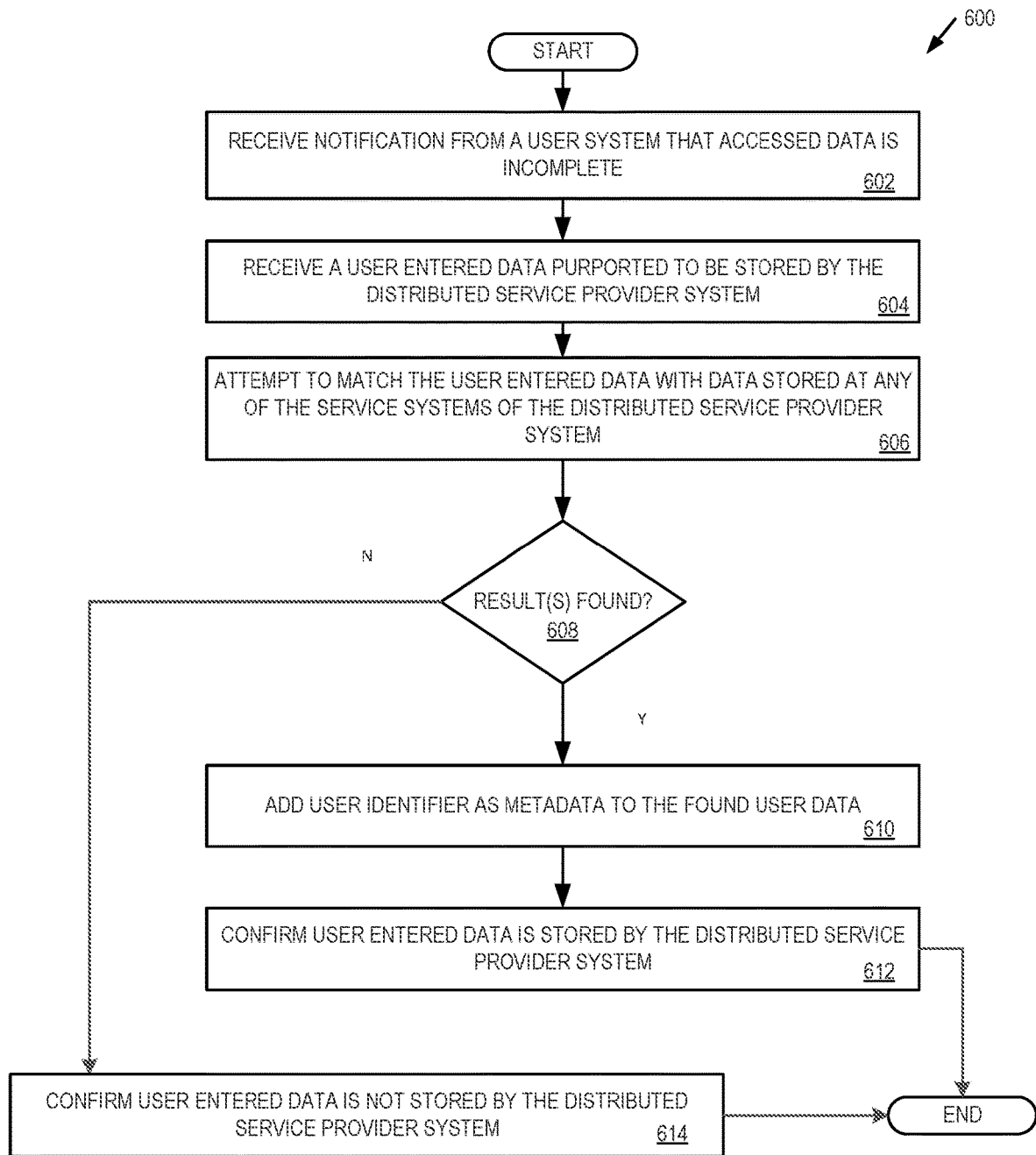
FIG. 6 is one embodiment of a process for a distributed service provider system fulfilling a user request to confirm additional user data is stored by the distributed service provider system.

FIG. 6 is one embodiment of a process for a distributed service provider system fulfilling a user request to confirm additional user data is stored by the distributed service provider system. The process 600 is performed by processing logic that may comprise hardware (circuitry, dedicated logic, etc.), software (such as is run on a general purpose computer system or a dedicated machine), firmware, or a combination. In one embodiment, the method 500 is performed by systems of a distributed service system 110 or 200, such as a user interface system 250, data access and deletion system 240, and one or more service systems 220-1 through 220-N.

Processing logic begins by receiving a notification from a user system that accessed data is incomplete (processing block 602). For example, a user seeking access to their data at the distributed service provider system may believe that they have additional data stored by the distributed service provider system. Thus, in embodiments, the dashboard user interface discussed above may, in embodiments, provide a link, button, or other mechanism with which a user may indicate that their data returned in an access request appears to be incomplete.

Processing logic receives a user entered data purported to be stored by the distributed service provider system (processing block 604). When the above discussed link, button, etc. is selected by a user, the dashboard user interface prompts the user to enter the data they believe may be stored at the distributed service provider system, but which was not returned in the data access request. Processing logic then attempts to match the user entered data with data stored at any of the service systems of the distributed service provider system (processing block 606). In embodiments, processing logic searches for exact data matches to preserve integrity of user data and avoid over inclusion. That is, a user may enter additional email address, phone numbers, credit card numbers, bank account numbers, social security number, bank account number, user account information of the distributed system, etc. of data that they think may be stored at the distributed service provider system. Furthermore, processing logic, will attach previously confirmed data associated with a user's identity. This combination of data (e.g., previously confirmed user data and user entered data) is then transmitted to each service system 220 via the data access and deletion system via API based messaging, as discussed herein. Then each service system uses the received data to search for any record(s) in their associated data stores that may be linked, contain, or otherwise associated with that user entered data and that are also associated with the previously confirmed data. Then, only exact matches with confirmatory user data are considered matches at processing block 606. For example, to prevent an example user Eve from entering random account numbers, passport numbers, email addresses, etc. that may belong to another user, such as Bob, processing logic uses the combination of user entered data and previously confirmed data (e.g., that found as being linked to a user identifier as discussed above) to find a match. Then, for example, an account number provide by Eve as user entered data could be found as a "match" when other confirmatory data is also present in the record containing the user entered data, which does not necessarily contain the original initial user identifier. In some embodiments, by not relying only on user entered data to find matches, a more secure approach to locating additional user data, that prevents user data fishing, results.

If no matches are found (e.g., by any service system), processing logic confirms that the user entered data is not stored by the distributed service provider system (processing block 614). However, if a match is found, processing logic adds the user identifier (e.g., in the original data access request) as metadata to the found user data (processing block processing block 610). In an embodiment, a service system in which the user entered data is found adds the global user identifier (e.g., a user email or telephone number associated with the original access request) to the data record in which the user data is found. By doing this, processing logic adds an annotation with which the libraries discussed above can later find, access, and delete the user data. Processing logic then confirms the user entered data is stored by the distributed service provider system (processing block 612). This confirmed user data, which has been annotated with the user identifier, is then subject to the data access and deletion processes discussed above.

Figure 7A:
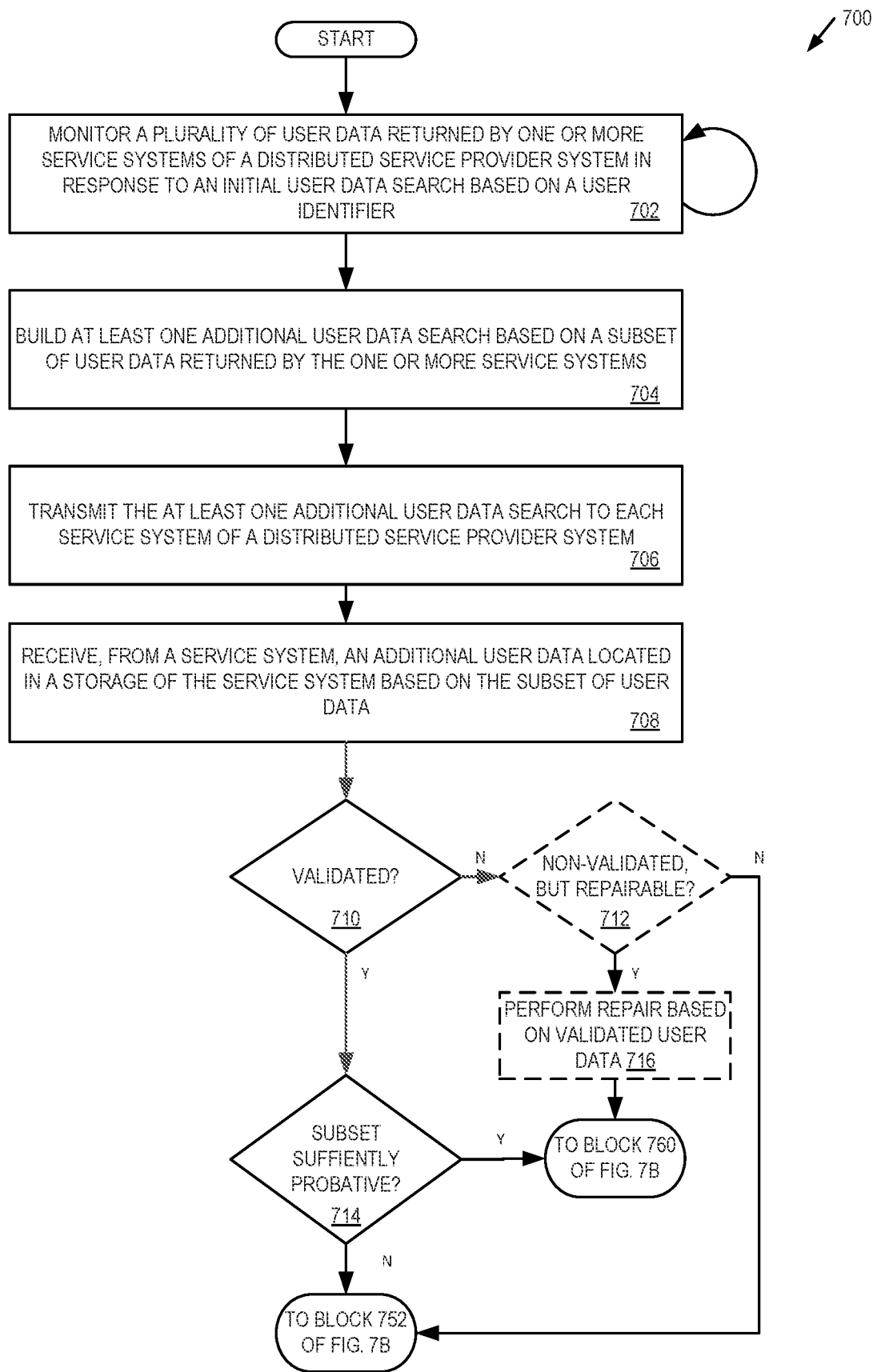
FIGS. 7A and 7B are an embodiment of a process for a distributed service provider system augmenting searches of user data stored by the distributed service provider system and confirming inferred data is user data stored by the distributed service provider system.
Figure 7B:
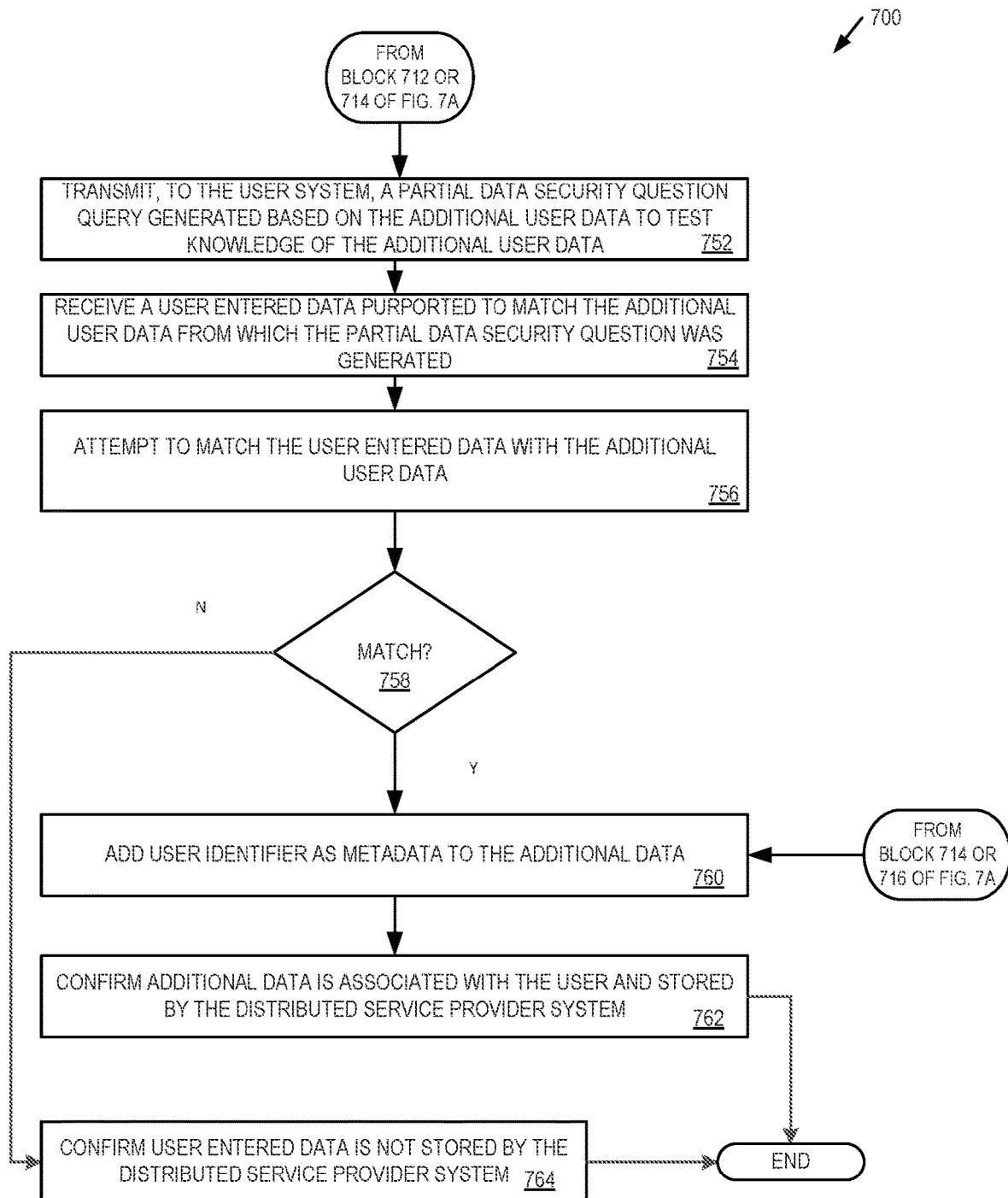

FIGS. 7A and 7B are embodiments of a process 700 for a distributed service provider system augmenting searches of user data stored by the distributed service provider system and confirming inferred data is user data stored by the distributed service provider system. The process 700 is performed by processing logic that may comprise hardware (circuitry, dedicated logic, etc.), software (such as is run on a general purpose computer system or a dedicated machine), firmware, or a combination. In one embodiment, the process 700 is performed by systems of a distributed service system 110 or 200, such as a user interface system 250, data access and deletion system 240, a user data search augmentor 247, and one or more service systems 220-1 through 220-N.

Processing logic begins by monitoring a plurality of user data returned by one or more service systems of a distributed service provider system in response to an initial user data search based on a user identifier (processing block 702). As discussed herein, an initial set of queries for user data are transmitted to each service system of a distributed service provider system, where the initial query is based on a user identifier provided by a user and verified as belonging to the user. The search results that are being monitored are therefore based on this identifier where user data is located and returned by each service system when such user data is associated with that identifier. However, as one or more additional queries are executed, the results of these queries are also monitored to further build additional user data searches until either no additional user data is found or all additional search queries are built and executed, as discussed below.

The results being monitored, however, may be incomplete as not all user data stored by service systems may be associated with the user identifier. Thus, to capture additional user data that is associated with the user and which may not be associated with the user identifier in the records, tables, databases, etc. of each service systems, processing logic then builds at least one additional user data search based on a subset of user data returned by the one or more service systems (processing block 704). That is, the user data found using the initial user identifier based queries is used to construct predetermined subsets of user data. Such subsets are predefined as each subset is associated with one or more specific pieces of user data. Furthermore, a number of such subsets is also predetermined so as to control the number of additional queries. However, the number and composition of the subsets of user data forming the additional user data searches are configured to have high probative value for identifying user data not associated with the received user identifier, and provide coverage to ensure the location of additional user data.

Processing logic then transmits the at least one additional user data search to each service system of a distributed service provider system (processing block 706). The transmission and performance (by the service systems) of the additional user data searches, which have been constructed based on subsets of user data returned by the initial queries, are performed as discussed in greater detail above. Furthermore, processing logic at block 706 transmits one or more additional searches that are built according to the user data search results.

Processing logic receives, from a service system, an additional user data located in a storage of the service system based on the subset of user data (processing block 708). This additional user data, although found using a data search query formed from a subset of user data that ensures sufficient probative value, may still be subject to verification.

In an embodiment, processing logic determines whether the additional user data is validated (processing block 710). As discussed above, certain user data supplied to the distributed service provider system by a $3^{rd}$ party (e.g., a partner system, an information system, etc.) may not have been validated as belonging to a user by the $3^{rd}$ party and/or validation purported to have been performed by the $3^{rd}$ party is not trusted by the distributed service provider system. That is, to ensure user data privacy, data which is from a third party may, in some embodiments, be automatically assumed as not having been validated or insufficiently validated so that processing logic is to perform validation and/or authentication. In an embodiment, as discussed herein, a validation annotation in returned data is checked when determining validation status.

When the additional user data is determined to be non-validated user data, processing logic further determines if the non-validated user data is repairable (processing block 712). In some embodiments, repair of non-validated user data is optional in an attempt to avoid reaching out to a user with partial user data queries (as discussed in FIG. 7B). More specifically, chains of user data are constructed by processing logic from validated and non-validated user data. For example, Service 1 may return the user data of a mailing address, date of birth, and social security number in response to a query based on the user identifier. The user identifier of Service 1 is validated by the distributed service provider system prior to the query, and thus the returned user data would be considered as validated forming a chain between the user identifier, mailing address, date of birth, and social security number. Continuing the example, Service 2 may return user data of a credit card number and a second mailing address in response to a query based on a non-validated user identifier, and thus the credit card number and second mailing address would not be considered to be validated. However, in an embodiment where the first and second mailing address are the same, then the credit card number associated with validated user data can also be considered as validated (e.g., repaired). Processing logic can then perform a repair by updating the validation status annotation associated with the data (processing block 716). The process then proceeds to block 760 of FIG. 7B. By seeking user data to repair (e.g., validate) and performing the validation, the data access request and deletion processing efficiency can be increased by reducing the number of user interfaces and/or requests generated and transmitted to a user system.

In embodiments, however, any non-validated and/or $3^{rd}$ party user data is subject to user confirmation, and all non-validated user data proceeds directly to block 752 of FIG. 7B to ensure the non-validated user data is actual user data associated with the user. Furthermore, this non-validated user data is subject to confirmation as discussed herein.

Returning to block 710, when the additional user data is determined to be validated, processing logic can proceed to processing block 714 to determine if the user data subset forming the user query used to obtain the additional user data is sufficiently probative. As discussed herein, certain combinations of user data used to form additional queries are sufficiently unique so that a threshold confidence in results is formed that any additional user data found based on the subset combination of user data belongs to the user associated with the originally received user ID. For example, demographically, the combination of user data corresponding to a date of birth, gender, and zip code is sufficiently unique so that any additional data records having this combination of user data are sufficiently likely to be associated with the user identifier, and additional data located using this combination are therefore likely to be associated with the user identifier. In embodiments, this determination at processing block 714 further increases the efficiency of the user data location and confirmation processes discussed herein to further conserve system resources. Thus, when the subset of user data used to form an additional user data query is such a subset predetermined to be sufficiently probative, processing logic proceeds to block 760 to bypass user verification of the located additional user data. However, when the subset of user data used to form the additional user data query not sufficiently probative, processing logic proceeds to block 754 to obtain user verification of the located additional user data before adding the additional data to the user data's access request data.

With reference to FIG. 7B, processing blocks 712 or 714 (e.g., when a search subset if not sufficiently probative or non-validated data cannot be repaired) proceed to block 752 of FIG. 7B. Processing block 752 transmits to the user system, a partial data security question generated based on the additional user data to test knowledge of the additional user data (processing block 752). As discussed herein, the security question can include redacted and/or blank portions of the additional user data, as shown in Table 6 above. Thus, the user is required to provide the remaining and/or missing portion to prove knowledge of the user data, and thus ownership. That is, in embodiments, the additional user data is inferred as likely user data until confirmed by a user. Because this is sensitive user data, a partial data, such as the redacted form of data is used to query a user for full user data, such as that shown above in Table 6. Thus, a data record may be inferred as belonging to a user when the user's SSN from an access request is found in that data record. Then, one or more pieces of data may be used to query the user for their knowledge of that data (e.g., provide your credit card number ending in _____1234, provide your address on Mockingbird Lane, etc.). A series of these questions given to a user in a dashboard user interface, similar to verification discussed above, is therefore used to confirm that inferred data is user data.

Processing logic receives a user entered data purported to match the additional user data from which the partial data security question was generated (processing block 754). Then, processing logic attempts to match the user entered data with the additional user data (processing block 756). In embodiments, processing logic only recognizes exact data matches to preserve integrity of user data and avoid over inclusion. If there is not a match between the user entered data and the additional user data, processing logic confirms that the user entered data is not stored by the distributed service provider system (processing block 764). In embodiments, a user may be given a predetermined number of attempts to match the additional user data forming a loop between blocks 758-752. This useful to account for user input error.

However, if a match is found, processing logic adds the user identifier (e.g., in the original data access request) as metadata to the additional/inferred user data (processing block processing block 760). Furthermore, in FIG. 7A, where non-validated data is repaired (e.g., validated due to a chain of validated user data fixing a broken link in a data chain from non-validated user data), or where an additional search query is sufficiently probative (e.g., based on the combination of user data forming the additional search query), the process can proceed directly to block 760 to associate the user identifier with the additional user data to bypass the operations of blocks 752-758.

Processing logic then confirms the additional/inferred data is associated with the user and stored by the distributed service provider system (processing block 762). Thus, the additional user data is updated as belonging to the set of user data stored by distributed service provider system (e.g., in data store 246), and may be presented to the user via the dashboard user interface discussed above.

In an embodiment, additional user data may be automatically inferred to locate user data not returned in an initial user data access request. Furthermore, in an embodiment, the process of FIGS. 7A and 7B may be performed prior to that in FIG. 6, such as automatically and in response to an initial data access request in an attempt to surface all possible user data associated with a user. Then, in embodiments, the process of FIG. 6 could be used as a fall back for a user that believes not all data stored by the distributed service provider system is reflected in the access request results. In the embodiments, the processes of FIGS. 3, 4, 5, 6, 7A and 7B ensure that a complete picture of user data stored and keyed to a received user identifier, inferable from found user data, and then returnable in response to a user's requests is presented to a user, and further that such data is deletable in response to user requests, as discussed herein.

FIG. 8 is one embodiment of a computer system that may be used to support the systems and operations discussed herein. For example, the computer system illustrated in FIG. 8 may be used by a user interface system, a data access and deletion system, a service system, a user system, or any combination of such systems. It will be apparent to those of ordinary skill in the art, however that other alternative systems of various system architectures may also be used.

The data processing system illustrated in FIG. 8 includes a bus or other internal communication means 815 for communicating information, and a processor 810 coupled to the bus 815 for processing information. The system further comprises a random access memory (RAM) or other volatile storage device 850 (referred to as memory), coupled to bus 815 for storing information and instructions to be executed by processor 810. Main memory 850 also may be used for storing temporary variables or other intermediate information during execution of instructions by processor 810. The system also comprises a read only memory (ROM) and/or static storage device 820 coupled to bus 815 for storing static information and instructions for processor 810, and a data storage device 825 such as a magnetic disk or optical disk and its corresponding disk drive. Data storage device 825 is coupled to bus 815 for storing information and instructions.

The system may further be coupled to a display device 870, such as a light emitting diode (LED) display or a liquid crystal display (LCD) coupled to bus 815 through bus 865 for displaying information to a computer user. An alphanumeric input device 875, including alphanumeric and other keys, may also be coupled to bus 815 through bus 865 for communicating information and command selections to processor 810. An additional user input device is cursor control device 880, such as a touchpad, mouse, a trackball, stylus, or cursor direction keys coupled to bus 815 through bus 865 for communicating direction information and command selections to processor 810, and for controlling cursor movement on display device 870.

Another device, which may optionally be coupled to computer system 800, is a communication device 890 for accessing other nodes of a distributed system via a network. The communication device 890 may include any of a number of commercially available networking peripheral devices such as those used for coupling to an Ethernet, token ring, Internet, or wide area network. The communication device 890 may further be a null-modem connection, or any other mechanism that provides connectivity between the computer system 800 and the outside world. Note that any or all of the components of this system illustrated in FIG. 8 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 850, mass storage device 825, or other storage medium locally or remotely accessible to processor 810.

It will be apparent to those of ordinary skill in the art that the system, method, and process described herein can be implemented as software stored in main memory 850 or read only memory 820 and executed by processor 810. This control logic or software may also be resident on an article of manufacture comprising a computer readable medium having computer readable program code embodied therein and being readable by the mass storage device 825 and for causing the processor 810 to operate in accordance with the methods and teachings herein.

The embodiments discussed herein may also be embodied in a handheld or portable device containing a subset of the computer hardware components described above. For example, the handheld device may be configured to contain only the bus 815, the processor 810, and memory 850 and/or 825. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 810, a data storage device 825, a bus 815, and memory 850, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

We claim:

1. A method for a distributed service provider system performing authentication for access to, and deletion of, user data, the method comprising:
    monitoring, by the distributed service provider system, service system responses to requests for user data associated with a user identifier, the user identifier received from a user system with a user data access request and purported to identify a user who is an owner of the user identifier, and the distributed service provider system comprises a plurality of service systems wherein the user data comprises sensitive personal identification information (PII) associated with the user identifier, and a dynamic user data associated with the user identifier, wherein the dynamic user data comprises transaction data that is associated with the user identifier;
    ordering, by the distributed service provider system, the monitored user data based on one or more of a sensitivity level and a veracity level associated with each of the monitored user data and ordering the dynamic user data ahead of the sensitive PII;
    filtering out, by the distributed service provider system, user data from the monitored user data that is not suitable for presenting to the user for identity verification, including filtering out the user data based on the veracity level indicating a low veracity;
    selecting, by the distributed service provider system, a subset of the filtered user data for a series of identity verification questions;
    generating and transmitting, by the distributed service provider system to the user system, a series of security verification questions according to the ordering, each security verification question and respective correct responses being based on one of the selected subset of the filtered user data; and
    when the distributed service provider system receives the respective correct responses to a predetermined number of the series of security verification questions from the user system, authenticating the user as owning the user identifier and providing access to the user data associated with the user identifier.

2. The method of claim 1, wherein the dynamic user data comprises one or more of, a transaction date, or a bank account balance associated with the user identifier.

3. The method of claim 1, wherein different forms of sensitive PII are associated with different sensitivity levels, and wherein forms of different dynamic user data are associated with different veracity levels.

4. The method of claim 1, wherein the ordering further comprises:
    ordering each sensitive PII in the monitored user data based on a sensitivity level associated with said each sensitive PII, wherein more sensitive PII is ordered ahead of less sensitive PII.

5. The method of claim 1, wherein sensitive PII comprises one or more of biometric identifier, a social security number, a government identification number, a bank account number, a card number, a physical address, a phone number, an email address, an IP address, a date of birth, and a user name.

6. The method of claim 2, wherein unsuitable user data is determined not to be suitable for presenting to the user for identity verification and filtered out when:
    the unsuitable user data is sensitive PII that is publicly available user data, user data difficult for the user of the user system to determine, or a combination thereof; and/or
    the unsuitable user data is dynamic user data that is associated with a recurring transaction, a charge amount that does not satisfy a minimum charge amount threshold, is associated with a transaction data that exceeds a maximum transaction age threshold, or a combination thereof.

7. The method of claim 1, wherein the user is the owner of the user identifier when the user is the actual user associated with the received user identifier.

8. The method of claim 1, wherein prior to the monitoring, the method further comprises:
    receiving, by the distributed service provider system from the user system, the user identifier with the user data access request, wherein the user identifier comprises one of a telephone number or an email address;
    performing, by the distributed service provider system, a first authentication to verify the user has possession of the user device by sending a first authentication challenge to the user identifier;
    in response to receiving a correct response to the first authentication challenge from the user device, transmitting, by the distributed service provider system, a plurality of service system request messages that each request a service system to determine whether the service system stores user data, each of the plurality of service system request messages comprising the user identifier;
    transmitting, by the distributed service provider system, a service system request message to each service system, wherein each service system comprises a data store managed said each service system, and wherein the service system request message causes each service system to search the data store managed by the service system for user data associated with the user identifier;

receiving, by the distributed service provider system from each service system, a response message indicating whether said each service system has user data stored within the data store managed by said each service system; and monitoring, by the distributed service provider system, response messages received from each service system for the user data associated with the user identifier.

9. The method of claim 1, wherein the generating and transmitting, by the distributed service provider system to the user system, the series of security verification questions comprises causing a dashboard user interface to be rendered to the user of the user system, the dashboard user interface presenting the series of security verification questions to the user according to the ordering;

receiving user responses to the series of security verification questions, the user responses entered by the user in the dashboard user interface, the distributed service provider system receiving the user responses from the dashboard user interface; and verifying that each user response corresponding to each of the series of security verification questions matches an expected user response based on user data from the subset of the filtered user data used for a particular security verification question.

10. The method of claim 1, wherein each service system comprises processing resources and storage resources that are independent of one or more other service systems that provide different services of the distributed service provider system.

11. The method of claim 1, wherein the distributed service provider system comprises a distributed commerce system.

12. A non-transitory computer readable storage medium including instructions that, when executed by a processor, cause the processor to perform operations for a distributed service provider system performing authentication for access to, and deletion of, user data, the operations comprising:

monitoring, by the distributed service provider system, service system responses to requests for user data associated with a user identifier, the user identifier received from a user system with a user data access request and purported to identify a user who is an owner of the user identifier, and the distributed service provider system comprises a plurality of service systems wherein the user data comprises sensitive personal identification information (PII) associated with the user identifier, and a dynamic user data associated with the user identifier, wherein the dynamic user data comprises transaction data that is associated with the user identifier;

ordering, by the distributed service provider system, the monitored user data based on one or more of a sensitivity level and a veracity level associated with each of the monitored user data and ordering the dynamic user data ahead of the sensitive PII;

filtering out, by the distributed service provider system, user data from the monitored user data that is not suitable for presenting to the user for identity verification, including filtering out the user data based on the veracity level indicating a low veracity;

selecting, by the distributed service provider system, a subset of the filtered user data for a series of identity verification questions;

generating and transmitting, by the distributed service provider system to the user system, a series of security verification questions according to the ordering, each security verification question and respective correct responses being based on one of the selected subset of the filtered user data; and when the distributed service provider system receives the respective correct responses to a predetermined number of the series of security verification questions from the user system, authenticating the user as owning the user identifier and providing access to the user data associated with the user identifier.

13. The non-transitory computer readable storage medium of claim 12, wherein the dynamic user data comprises one or more of a transaction date, or a bank account balance associated with the user identifier.

14. The non-transitory computer readable storage medium of claim 11, wherein different forms of sensitive PII are associated with different sensitivity levels, and wherein forms of different dynamic user data are associated with different veracity levels.

15. The non-transitory computer readable storage medium of claim 11 wherein the ordering further comprises:

ordering each sensitive PII in the monitored user data based on a sensitivity level associated with said each sensitive PII, wherein more sensitive PII is ordered ahead of less sensitive PII.

16. The non-transitory computer readable storage medium of claim 11, wherein sensitive PII comprises one or more of biometric identifier, a social security number, a government identification number, a bank account number, a card number, a physical address, a phone number, an email address, an IP address, a date of birth, and a user name.

17. The non-transitory computer readable storage medium of claim 13, wherein unsuitable user data is determined not to be suitable for presenting to the user for identity verification and filtered out when:

the unsuitable user data is sensitive PII that is publicly available user data, user data difficult for the user of the user system to determine, or a combination thereof; and/or the unsuitable user data is dynamic user data that is associated with a recurring transaction, a charge amount that does not satisfy a minimum charge amount threshold, is associated with a transaction data that exceeds a maximum transaction age threshold, or a combination thereof.

18. The non-transitory computer readable storage medium of claim 12, wherein prior to the monitoring, the operations further comprise:

receiving, by the distributed service provider system from the user system, the user identifier with the user data access request, wherein the user identifier comprises one of a telephone number or an email address;

performing, by the distributed service provider system, a first authentication to verify the user has possession of the user device by sending a first authentication challenge to the user identifier;

in response to receiving a correct response to the first authentication challenge from the user device, transmitting, by the distributed service provider system, a plurality of service system request messages that each request a service system to determine whether the service system stores user data, each of the plurality of service system request messages comprising the user identifier;

transmitting, by the distributed service provider system, a service system request message to each service system, wherein each service system comprises a data store managed said each service system, and wherein the service system request message causes each service system to search the data store managed by the service system for user data associated with the user identifier;

receiving, by the distributed service provider system from each service system, a response message indicating whether said each service system has user data stored within the data store managed by said each service system; and monitoring, by the distributed service provider system, response messages received from each service system for the user data associated with the user identifier.

19. The non-transitory computer readable storage medium of claim 12, wherein the generating and transmitting, by the distributed service provider system to the user system, the series of security verification questions comprises:

causing a dashboard user interface to be rendered to the user of the user system, the dashboard user interface presenting the series of security verification questions to the user according to the ordering;

receiving user responses to the series of security verification questions, the user responses entered by the user in the dashboard user interface, the distributed service provider system receiving the user responses from the dashboard user interface; and verifying that each user response corresponding to each of the series of security verification questions matches an expected user response based on user data from the subset of the filtered user data used for a particular security verification question.

20. A distributed service processing system, comprising:
a memory; and
a processor, coupled with the memory, configured to:
monitor service system responses to requests for user data associated with a user identifier, the user identifier received from a user system with a user data access request and purported to identify a user who is an owner of the user identifier, and the distributed service provider system comprises a plurality of service systems wherein the user data comprises sensitive personal identification information (PII) associated with the user identifier, and a dynamic user data associated with the user identifier, wherein the dynamic user data comprises transaction data that is associated with the user identifier,
order the monitored user data based on one or more of a sensitivity level and a veracity level associated with each of the monitored user data and ordering the dynamic user data ahead of the sensitive PII,
filter out user data from the monitored user data that is not suitable for presenting to the user for identity verification, including to filter out the user data based on the veracity level indicating a low veracity,
select a subset of the filtered user data for a series of identity verification questions,
generate and transmit, to the user system, a series of security verification questions according to the ordering, each security verification question and respective correct responses being based on one of the selected subset of the filtered user data, and
when the respective correct responses to a predetermined number of the series of security verification questions are received from the user system, authenticate the user as owning the user identifier and provide the user access to the user data associated with the user identifier.

* * * * *